(12) United States Patent
Naert et al.

(10) Patent No.: US 9,534,104 B2
(45) Date of Patent: Jan. 3, 2017

(54) PLASTICIZER BLENDS AND USE THEREOF

(71) Applicant: ExxonMobil Chemical Patents Inc., Baytown, TX (US)

(72) Inventors: Didier Naert, Brussels (BE); Bernard F. Leroy, C'eroux-Mousty (BE); Christine A. Costello, Easton, PA (US); Stephen Zushma, Clinton, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/319,906

(22) Filed: Jun. 30, 2014

(65) Prior Publication Data

US 2014/0315021 A1    Oct. 23, 2014

Related U.S. Application Data

(63) Continuation-in-part of application No. 14/164,889, filed on Jan. 27, 2014, which is a continuation-in-part of application No. 13/751,835, filed on Jan. 28, 2013, now Pat. No. 8,829,093.

(51) Int. Cl.
*C08K 5/00* (2006.01)
*C08K 5/09* (2006.01)
*C08K 5/101* (2006.01)
*C08K 5/12* (2006.01)
*C09D 127/06* (2006.01)
*H01B 3/44* (2006.01)

(52) U.S. Cl.
CPC ............. *C08K 5/101* (2013.01); *C08K 5/12* (2013.01); *C09D 127/06* (2013.01); *H01B 3/443* (2013.01); *Y10T 428/2967* (2015.01)

(58) Field of Classification Search
CPC .......... C08K 5/101; C08K 5/12; C09D 127/06
USPC ........................................................ 524/287
See application file for complete search history.

(56) References Cited

U.S. PATENT DOCUMENTS

| | | | |
|---|---|---|---|
| 2,520,084 A * | 8/1950 | Dazzi | 524/290 |
| 2,634,248 A | 4/1953 | Dazzi | |
| 2,976,266 A | 3/1961 | Lytton et al. | |
| 3,296,065 A | 1/1967 | O'Brien et al. | |
| 3,842,040 A | 10/1974 | Browne et al. | |
| 3,842,041 A | 10/1974 | Browne et al. | |
| 3,928,481 A | 12/1975 | Suggitt | |
| 3,928,484 A | 12/1975 | Suggitt | |
| 3,962,362 A | 6/1976 | Suggitt | |
| 4,123,470 A | 10/1978 | Murtha | |
| 4,218,572 A | 8/1980 | Dolhyj et al. | |
| 4,263,457 A | 4/1981 | Takeda et al. | |
| 4,294,976 A | 10/1981 | Itatani et al. | |
| 4,463,207 A | 7/1984 | Johnson | |
| 4,959,450 A | 9/1990 | Morris et al. | |
| 5,001,296 A | 3/1991 | Howley et al. | |
| 5,138,022 A | 8/1992 | Mang et al. | |
| 6,037,513 A | 3/2000 | Chang et al. | |
| 6,103,919 A | 8/2000 | Schiraldi et al. | |
| 6,274,756 B1 | 8/2001 | Caers et al. | |
| 6,355,711 B1 | 3/2002 | Godwin et al. | |
| 6,433,236 B1 | 8/2002 | Schiraldi et al. | |
| 6,482,972 B1 | 11/2002 | Bahrmann et al. | |
| 6,730,625 B1 | 5/2004 | Chang et al. | |
| 6,740,254 B2 | 5/2004 | Zhou et al. | |
| 6,777,514 B2 | 8/2004 | Patil et al. | |
| 7,297,738 B2 * | 11/2007 | Gosse et al. | 524/285 |
| 8,604,114 B2 | 12/2013 | Dakka et al. | |
| 8,829,093 B2 | 9/2014 | Dakka et al. | |
| 2005/0215433 A1 | 9/2005 | Benitez et al. | |
| 2006/0247461 A1 | 11/2006 | Schlosberg et al. | |
| 2008/0242895 A1 | 10/2008 | Godwin et al. | |
| 2009/0299111 A1 | 12/2009 | Kanbara et al. | |
| 2010/0159177 A1 | 6/2010 | Dakka et al. | |
| 2011/0151162 A1 | 6/2011 | Dakka et al. | |
| 2011/0184105 A1 | 7/2011 | Dakka et al. | |
| 2011/0215433 A1 | 9/2011 | Kokubum | |
| 2012/0108726 A1 | 5/2012 | Godwin et al. | |
| 2012/0108874 A1 | 5/2012 | Gralla et al. | |

(Continued)

FOREIGN PATENT DOCUMENTS

| JP | 2-196844 A | 8/1990 |
|---|---|---|
| JP | 02196844 A * | 8/1990 |

(Continued)

OTHER PUBLICATIONS

U.S. Appl. No. 61/040,480, filed Mar. 28, 2008, Godwin.
U.S. Appl. No. 61/203,626, filed Dec. 24, 2008, Dakka et al.
U.S. Appl. No. 13/751,835, filed Jan. 28, 2013, Dakka et al.
U.S. Appl. No. 14/164,889, filed Jan. 27, 2014, Dakka et al.
U.S. Appl. No. 14/201,173, filed Mar. 7, 2014, Dakka et al.
U.S. Appl. No. 14/201,224, filed Mar. 7, 2014, Dakka et al.
U.S. Appl. No. 14/201,226, filed Mar. 7, 2014, Bai et al.
U.S. Appl. No. 14/201,284, filed Mar. 7, 2014, Dakka et al.
U.S. Appl. No. 14/201,287, filed Mar. 7, 2014, Dakka et al.
Clary et al., "*A Green, One-Pot Route to the Biphenyldicarboxylic Acids: Useful Intermediates in Polymer Synthesis*," International Journal of Organic Chemistry, Jun. 2013, vol. 3, No. 2, pp. 143-147.
Godwin, A. D., "*Plasticizers,* " Applied Polymer Science 21$^{st}$ Century, edited by C. D. Craver and C. E. Carraher, Elsevier (2000), pp. 157-175.
Kulev, et al., "*Esters of Diphenic Acid and their Plasticizing Properties*", Izvestiya Tomskogo Politekhnicheskogo Instituta, 1961, 111. (English abstract only).
Shioda et al., "*Synthesis of Dialkyl Diphenates and their Properties*", Yuki Gosei Kagaku Kyokaishi, 1959, 17. (English abstract only).

(Continued)

*Primary Examiner* — Hui Chin

(57) ABSTRACT

Provided are mixtures of 1) compounds of the formula:

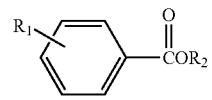

wherein $R_1$ is a saturated or unsaturated cyclic hydrocarbon optionally substituted with an alkyl and/or an OXO-ester, and $R_2$ is a $C_4$ to $C_{14}$ hydrocarbyl; and 2) one or more second plasticizers selected from the group consisting of alkyl terephthalates, alkyl phthalates, alkyl benzoate esters, dibenzoate esters, esters of cyclohexane polycarboxylic acids, and dialkyl adipates. Also provided are plasticized polymer compositions containing said mixtures.

38 Claims, 4 Drawing Sheets

(56) References Cited

U.S. PATENT DOCUMENTS

| | | |
|---|---|---|
| 2012/0283494 A1 | 11/2012 | Smith et al. |
| 2014/0212666 A1 | 7/2014 | Dakka et al. |
| 2014/0213709 A1 | 7/2014 | Dakka et al. |
| 2014/0272626 A1 | 9/2014 | Berlowitz et al. |
| 2014/0275605 A1 | 9/2014 | Dakka et al. |
| 2014/0275606 A1 | 9/2014 | Bai et al. |
| 2014/0275607 A1 | 9/2014 | Dakka et al. |
| 2014/0275609 A1 | 9/2014 | Dakka et al. |
| 2014/0315021 A1 | 10/2014 | Naert et al. |
| 2014/0316155 A1 | 10/2014 | Dakka et al. |
| 2014/0323782 A1 | 10/2014 | Chen et al. |
| 2014/0378697 A1 | 12/2014 | de Smit et al. |
| 2015/0080545 A1 | 3/2015 | Dakka et al. |
| 2015/0080546 A1 | 3/2015 | Dakka et al. |

FOREIGN PATENT DOCUMENTS

| | | |
|---|---|---|
| JP | 08-020548 A | 1/1996 |
| JP | 08-099914 | 4/1996 |
| SU | 412182 | 1/1974 |
| WO | WO 99/32427 | 7/1999 |
| WO | WO 03/029339 | 4/2003 |
| WO | WO 2004/046078 | 6/2004 |
| WO | wo 2007/013469 | 2/2007 |
| WO | wo 2010/138248 | 12/2010 |
| WO | wo 2011/096989 | 8/2011 |
| WO | wo 2011/096993 | 8/2011 |
| WO | WO 2012-018969 | 5/2012 |
| WO | wo 2012/082407 | 6/2012 |
| WO | wo 2014/159094 | 10/2014 |
| WO | wo 2014/159104 | 10/2014 |

OTHER PUBLICATIONS

U.S. Appl. No. 62/007,556, filed Jun. 4, 2014, Abichandani et al.
U.S. Appl. No. 62/012,024, filed Jun. 13, 2014, Salciccioli et al.
U.S. Appl. No. 62/012,037, filed Jun. 13, 2014, Dakka et al.
U.S. Appl. No. 62/026,889, filed Jan. 27, 2015, Dakka et al.
U.S. Appl. No. 62/138,179, filed Mar. 25, 2015, Evans et al.
U.S. Appl. No. 62/140,723, filed Mar. 31, 2015, Salciccioli et al.
U.S. Appl. No. 14/516,239, filed Oct. 16, 2014, Dakka et al.
U.S. Appl. No. 13/316,745, filed Dec. 12, 2011, Patil et al.
U.S. Appl. No. 14/480,363, filed Sep. 8, 2014, Dakka et al.
U.S. Appl. No. 14/486,945, filed Sep. 15, 2014, Dobin et al.
U.S. Appl. No. 14/527,480, filed Oct. 29, 2014, Patil et al.
U.S. Appl. No. 61/577,900, filed Dec. 20, 2011, Dakka et al.
U.S. Appl. No. 61/781,109, filed Mar. 14, 2013, Dakka et al.
U.S. Appl. No. 61/781,116, filed Mar. 14, 2014, Bai et al.
U.S. Appl. No. 61/781,129, filed Mar. 14, 2014, Dakka et al.
U.S. Appl. No. 61/781,137, filed Mar. 14, 2014, Dakka et al.
U.S. Appl. No. 61/781,728, filed Mar. 14, 2014, Dakka et al.
U.S. Appl. No. 62/012,024, filed Jun. 13, 2014, Saliciccioli et al.
U.S. Appl. No. 62/068,144, filed Oct. 24, 2014, Dakka et al.
U.S. Appl. No. 62/094,218, filed Dec. 19, 2014, Salciccioli et al.
U.S. Appl. No. 62/137,996, filed Mar. 25, 2015, Salciccioli et al.
Bandyopadhyay et al., "Transalkylation of cumene with toluene over zeolite Beta," Applied Catalysis A: General, 1996, vol. 135(2), pp. 249-259.
Bandyopadhyay et al., "Transalkylation reaction—an alternative route to produce industrially important intermediates such as cymene," Catalysis Today, 1998, vol. 44, pp. 245-252.
Borodina et al., "Hydroalkylation of Benzene and Ethylbenzene over Metal-Containing Zeolite Catalysts," Petroleum Chemistry, 2009, vol. 49(1), pp. 66-73.
Ennis et al., "Multikilogram-Scale Synthesis of a Biphenyl Carboxylic Acid Derivative Using a Pd/C-Mediated Suzuki Coupling Approach," Organic Process Research & Development, 1999, vol. 3(4), pp. 248-252.
Guo, et al., "Reactivity of 4,4'-Dimethylbiphenyl with Methanol over modified HZSM-5 Catalysts," PrePrints—American Chemical Society, Division of Petroleum Chemistry, 2003, vol. 48(4), pp. 280282.
Izard, "Effect of Chemical Structure on Physical Properties of Isomeric Polyesters," Journal of Polymer Science, 1952, vol. 9(1), 35-39.
Khromov et al., "Catalytic Conversion of 1,1'-Dimethyldicyclohexyl and 1-Methyl-1-Phenyl-Cyclohexane on Platinum Catalysts At Elevated Hydrogen Pressures And Temperatures," Vestnik Moskovskogo Universiteta, Seriya 2• Khimiya (1965), 20(1), 51-5, (English AbstractOnly).
Krigbaum et al., "Aromatic Polyesters Forming Thermotropic Smectic Mesophases," Journal of Polymer Science, Part C, Polymer Letters Edition, 1982, vol. 20(2), pp. 109-115.
Lagidze et al., "Analysis of Substances Produced by Reaction Between Aluminum Chloride and Diphenyl In Dearomatized Ligroin," V.I. Leni-n. Georgian Polytechnic Institute (1968), No. 2 (122), pp. 36-44. (English Translation).
Lu et al., "Selective Hydrogenation of Single Benzene Ring in Biphenyl Catalyzed by Skeletal Ni," ChemCatChem., 2009, vol. 1(3), pp. 369-371.
Mavrodinova et al., "Transalkylation of toluene with cumene over zeolites Y dealuminated in solid-state, Part I. Effect of the alteration of Broensted acidity," Applied Catalysis A: General, 2003, vol. 248, pp. 181-196.
Mavrodinova et al., "Transalkylation of toluene with cumene over zeolites Y dealuminated in solid-state Part II. Effect of the introduced Lewis acid sites," Applied Catalysis A: General, 2003, vol. 248, p. 197-209.
Meurisse et al., "Polymers with Mesogenic Elements and Flexible Spacers in the Main Chain: Aromatic-Aliphatic Polyesters," British Polymer Journal, 1981, vol. 13(2), pp. 55-63.
Mukhopadhyay et al., "Tandem One-Pot Palladium-Catalyzed Reductive and Oxidative Coupling of Benzene and Chlorobenzene," Journal of Organic Chemistry, 2000, vol. 65(10), pp. 3107-3110.
Roux et al., "Critically Evaluated Thermochemical Properties of Polycyclic Aromatic Hydrocarbons," Journal of Physical and Chemical Reference Data, 2008, vol. 37(4), pp. 1855-1996.
Sherman et al., "Dimethylbiphenyls from toluene," American Chemical Society, Chemical Innovation, 2000, pp. 25-30.
Sinfelt, "The turnover frequency of methylcyclohexane dehydrogenation to toluene on a Pt reforming catalyst," Journal of Molecular Catalysis A: Chemical, 2000, vol. 163, pp. 123-128.
Sinfelt et al., "Kinetics of Methylcyclohexane Dehydrogenation Over Pt-$Al_2O_3$," Journal of Physical Chemistry, 1960, vol. 64(10), 1559-1562.
Singh, et. al, "Studies on Isomer Distribution in the Products Obtained by Friedekrafts Alkylation of Toluene with Cyclic Electrophiles," National Academy Science Letters, 1983, vol. 6(10), pp. 321-325.
Zhang, et al., "Automation of Fluorous Solid-Phase Extraction for Parallel Synthesis," J. Comb. Chem, 2006, vol. 8, pp. 890-896.

* cited by examiner

US 9,534,104 B2

PLASTICIZER BLENDS AND USE THEREOF

PRIORITY CLAIM

This application is a continuation-in-part of U.S. application Ser. No. 14/164,889, filed Jan. 27, 2014, which is a continuation-in-part of U.S. application Ser. No. 13/751,835, filed Jan. 28, 2013.

FIELD OF THE INVENTION

This disclosure relates to plasticizer blends comprising aromatic ester plasticizers, and to compositions comprising the blend and thermoplastic polymer, such as polyvinylchloride.

BACKGROUND OF THE INVENTION

Plasticizers are incorporated into a resin (usually a plastic or elastomer) to increase the flexibility, workability, or distensibility of the resin. The largest use of plasticizers is in the production of "plasticized" or flexible polyvinyl chloride (PVC) products. Typical uses of plasticized PVC include films, sheets, flexible hoses, coated fabrics, wire and cable insulation and jacketing, toys, flooring materials such as vinyl sheet flooring or vinyl floor tiles, wall covering, adhesives, sealants, inks, and medical products such as blood bags, examination gloves and tubing, and the like.

Other polymer systems that use small amounts of plasticizers include polyvinyl butyral, acrylic polymers, nylon, polyolefins, polyurethanes, and certain fluoroplastics. Plasticizers can also be used with rubber (although often these materials fall under the definition of extenders for rubber rather than plasticizers). A listing of the major plasticizers and their compatibilities with different polymer systems is provided in "Plasticizers," A. D. Godwin, in Applied Polymer Science 21st Century, edited by C. D. Craver and C. E. Carraher, Elsevier (2000); pp. 157-175.

Plasticizers can be characterized on the basis of their chemical structure. The most important chemical class of plasticizers is phthalic acid esters, which accounted for 85% worldwide of PVC plasticizer usage in 2002.

Others include esters based on cyclohexanoic acid. In the late 1990's and early 2000's, various compositions based on cyclohexanoate, cyclohexanedioates, and cyclohexanepolyoate esters were said to be useful for a range of goods from semi-rigid to highly flexible materials. See, for instance, WO 99/32427, WO 2004/046078, WO 2003/029339, WO 2004/046078, U.S. Publication No. 2006/0247461, and U.S. Pat. No. 7,297,738.

Further others include esters based on benzoic acid (see, for instance, U.S. Pat. No. 6,740,254, and also co-pending, commonly-assigned, U.S. Patent Application No. 61/040,480, filed Mar. 28, 2008) or polyketones, such as described in U.S. Pat. No. 6,777,514; and also co-pending, commonly-assigned, U.S. Publication No. 2008/0242895, filed Mar. 28, 2008. Epoxidized soybean oil, which has much longer alkyl groups ($C_{16}$ to $C_{18}$) has been tried as a plasticizer, but is generally used as a PVC co-stabilizer due to their poorer compatibility with PVC. Stabilizers are used in much lower concentrations than plasticizers. Copending and commonly assigned U.S. Patent Application No. 61/203,626, filed Dec. 24, 2008, discloses triglycerides with a total carbon number of the triester groups between 20 and 25, produced by esterification of glycerol with a combination of acids derived from the hydroformylation and subsequent oxidation of $C_3$ to $C_9$ olefins, having excellent compatibility with a wide variety of resins.

U.S. Pat. No. 2,520,084 to Dazzi discloses plasticized vinyl chloride polymers using esters of phenyl benzoic acids and aliphatic hydrocarbon alcohols as plasticizers. Suitable esters are 2-ethylhexyl m-phenylbenzoate, the corresponding para- and ortho-phenylbenzoates, or mixtures thereof, and the various phenylbenzoates of n-hexyl, 2-methylheptyl, dodecyl, dimethylheptyl, 2-butoxyethyl, and isooctyl alcohols, and other homologous straight and branched alcohols having 8 to 14 atoms. The butoxyethyl and 2-ethylhexyl esters of phenylbenzoic acid are exemplified.

"Esters of diphenic acid and their plasticizing properties", Kulev et al., *Izvestiva Tomskogo Politekhnicheskogo Instituta* (1961) 111, discloses diisoamyl diphenate, bis(2-ethylhexyl diphenate and mixed heptyl, octyl and nonyl diphenates, prepared by esterification of diphenic acid, useful as plasticizers for vinyl chloride.

"Synthesis of dialkyl diphenates and their properties", Shioda et al., *Yuki Gosei Kagaku Kyokaishi* (1959), 17, discloses dialkyl diphenates of $C_1$ to $C_8$ alcohols, useful as plasticizers for poly(vinyl chloride) formed by converting diphenic acid to diphenic anhydride and esterifying the diphenic anhydride, necessarily resulting in 2,2'-substituted diesters of diphenic anhydride.

Other references of interest include: Clary, International Journal of Organic Chemistry, 2013, 3, 143-147; U.S. Publication No. 2012/0108874 A1; and U.S. Pat. No. 5,138,022.

Other references of interest also include: U.S. Ser. No. 13/751,835, filed Jan. 28, 2013; U.S. Ser. No. 14/164,889, filed Jan. 27, 2014; U.S. Ser. No. 14/201,173, filed Mar. 7, 2014; U.S. Ser. No. 14/201,226, filed Mar. 7, 2014; U.S. Ser. No. 14/201,287, filed Mar. 7, 2014; U.S. Ser. No. 14/201,224, filed Mar. 7, 2014; and U.S. Ser. No. 14/201,284, filed Mar. 7, 2014.

Thus, what is needed is a method of making a general purpose plasticizer having suitable melting or chemical and thermal stability, pour point, glass transition, increased compatibility, good gelation and ageing performance and low temperature properties.

SUMMARY OF THE INVENTION

In one aspect, the present application provides blends comprising: 1) one or more first plasticizer compounds of the formula:

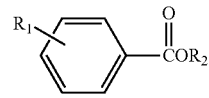

wherein $R_1$ is a saturated or unsaturated cyclic hydrocarbon optionally substituted with an alkyl and/or an OXO-ester, and $R_2$ is a $C_4$ to $C_{20}$ hydrocarbyl, preferably a hydrocarbon residue of a $C_4$ to $C_{20}$ OXO-alcohol; and 2) one or more second plasticizers comprising alkyl terephthalate, alkyl phthalate, alkyl benzoate ester, di-benzoate ester, ester of cyclohexane polycarboxylic acid, dialkyl adipate, or a mixture thereof.

In another aspect, the present application provides a polymer composition comprising: 1) a thermoplastic polymer, 2) one or more first plasticizer compounds of the formula:

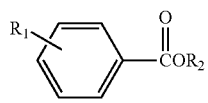

wherein $R_1$ is a saturated and unsaturated cyclic hydrocarbon optionally substituted with an alkyl and/or an OXO-ester, and $R_2$ is a $C_4$ to $C_{20}$ hydrocarbyl, preferably a hydrocarbon residue of a $C_4$ to $C_{20}$ OXO-alcohol, and 3) one or more second plasticizers comprising alkyl terephthalate, alkyl phthalate, alkyl benzoate ester, di-benzoate ester, ester of cyclohexane polycarboxylic acid, dialkyl adipate, or a mixture thereof.

DETAILED DESCRIPTION

Figure 1:
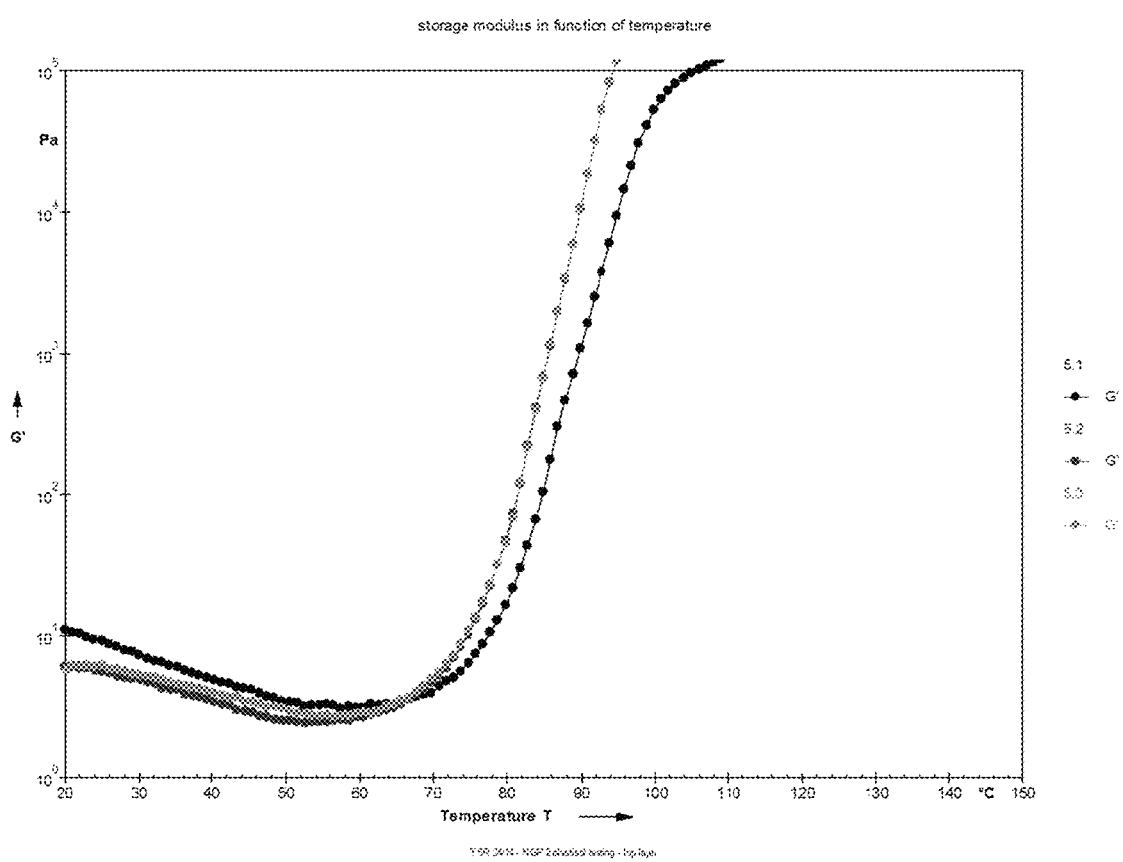
FIG. 1 shows gelation curves obtained by DMA for flooring wear layer formulations.

All numerical values within the detailed description and the claims herein are modified by "about" or "approximately" the indicated value, and take into account experimental error and variations that would be expected by a person having ordinary skill in the art.

Unless otherwise indicated, room temperature is about 21° C.

First Plasticizers

It has been determined that compounds of the general formula:

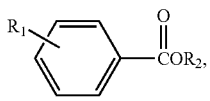

wherein $R_1$ is a saturated or unsaturated cyclic hydrocarbon, optionally substituted with an alkyl and/or an OXO-ester, and $R_2$ is a $C_4$ to $C_{20}$ hydrocarbyl (such as a $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, or $C_{20}$ hydrocarbyl), preferably, $C_4$ to $C_{14}$ hydrocarbyl, preferably the residue of a $C_4$ to $C_{14}$ OXO-alcohol (such as a $C_4$, $C_5$, $C_6$, $C_7$, $C_8$, $C_9$, $C_{10}$, $C_{11}$, $C_{12}$, $C_{13}$ or $C_{14}$ OXO-alcohol), are particularly useful as plasticizers when combined with one or more plasticizers comprising alkyl terephthalate, alkyl phthalate, alkyl benzoate ester, di-benzoate ester, ester of cyclohexane polycarboxylic acid, dialkyl adipate, or a mixture thereof, preferably selected from the group consisting of alkyl terephthalates, alkyl phthalates, alkyl benzoate esters, di-benzoate esters, esters of cyclohexane polycarboxylic acids, dialkyl adipates, and mixtures thereof. In many embodiments, it is useful to add the second plasticizer to obtain specific product attributes, such as viscosity or volatility.

In one aspect, the present application provides for mixtures comprising: 1) two or more (alternately three, four, five, six, or more) first plasticizer compounds of the formula (I):

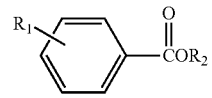

wherein $R_1$ is a saturated or unsaturated cyclic hydrocarbon optionally substituted with an alkyl and/or an OXO-ester, and $R_2$ is a $C_4$ to $C_{20}$ hydrocarbyl, preferably a hydrocarbon residue of a $C_4$ to $C_{20}$ OXO-alcohol; which, when combined with 2) one or more second plasticizers selected from the group consisting of alkyl terephthalates, alkyl phthalates, alkyl benzoate esters, di-benzoate esters, esters of cyclohexane polycarboxylic acids, dialkyl adipates, dibenzoic esters of glycols, and mixtures thereof are particularly useful as plasticizers.

In an embodiment of the invention, the first plasticizer is a mixture comprising two or more compounds represented by the formula (I) where $R_1$ is saturated at least one compound and where $R_1$ is unsaturated in at least one compound. Alternately, in another preferred embodiment of the invention, the first plasticizer is a mixture comprising two or more compounds represented by the formula (I): where $R_1$ in at least one compound is a saturated $C_6$ ring optionally substituted with an alkyl and/or an OXO-ester, and 2) where $R_1$ in at least one compound is an unsaturated $C_6$ ring optionally substituted with an alkyl and/or an OXO-ester.

In any embodiment of the invention described herein, $R_1$ may be an aromatic ring, preferably a substituted aromatic ring, preferably a $C_6$ aromatic ring, preferably a substituted $C_6$ aromatic ring, preferably an alkyl substituted $C_6$ aromatic ring, preferably a methyl substituted $C_6$ aromatic ring.

In any embodiment of the invention described herein, $R_1$ may be located at the ortho-, meta- or para-position. In any embodiment of the invention described herein, $R_1$ may be phenyl located at the para-position. In any embodiment of the invention described herein, $R_1$ may be an alkyl and/or an OXO-ester-substituted phenyl at the ortho-, meta-, or para-position, preferably $R_1$ is an alkyl and/or an OXO-ester-substituted cyclohexyl at the ortho-, meta-, or para-position, such as phenyl, methyl phenyl, benzyl, and the like. In any embodiment of the invention described herein, $R_1$ may be a substituted phenyl located at the ortho-, meta- or para-position. In any embodiment of the invention described herein, $R_1$ may be phenyl located at the para-position, preferably a substituted phenyl. In any embodiment of the invention described herein, $R_1$ may be phenyl located at the para-position, preferably a substituted phenyl, where the phenyl is substituted with a $C_1$ to $C_{20}$ alkyl, preferably a $C_1$ to $C_4$ alkyl, preferably a $C_1$ alkyl at the ortho-, meta- or para-position, for example $R^1$ may be tolyl. The phenyl group may be substituted at the 1, 2, 3, 4 or 5 positions, preferably at one position with a $C_1$ to $C_{20}$ alkyl, such as methyl, ethyl, propyl, butyl, pentyl, hexyl, heptyl, octyl, nonyl, decyl, undecyl, dodecyl, and isomers thereof. In any embodiment of the invention described herein, $R_2$ may be a $C_4$ to $C_{14}$ hydrocarbyl, preferably a $C_5$ to $C_{14}$ hydrocarbyl (such as a $C_4$, $C_5$, $C_6$, $C_7$, $C_8$, $C_9$, $C_{10}$, $C_{11}$, $C_{12}$, $C_{13}$ or $C_{14}$ hydrocarbyl), preferably butyl, pentyl, hexyl, heptyl, octyl, nonyl, decyl, undecyl, dodecyl, tridecyl, tetradecyl or an isomer thereof, preferably a $C_5$, $C_6$, $C_7$, $C_8$, $C_9$ and $C_{10}$ hydrocarbyl, preferably a $C_5$ to $C_{11}$ hydrocarbyl, preferably $C_6$ to $C_{10}$ hydrocarbyl.

In another embodiment of the invention, $R_1$ is substituted with an

group, where $R_3$ is a $C_4$ to $C_{14}$ hydrocarbyl (such as a $C_4$, $C_5$, $C_6$, $C_7$, $C_8$, $C_9$, $C_{10}$, $C_{11}$, $C_{12}$, $C_{13}$ or $C_{14}$ hydrocarbyl), preferably a hydrocarbon residue of a $C_4$ to $C_{14}$ OXO-alcohol (such as a $C_4$, $C_5$, $C_6$, $C_7$, $C_8$, $C_9$, $C_{10}$, $C_{11}$, $C_{12}$, $C_{13}$ or $C_{14}$ hydrocarbon residue), preferably a $C_5$ to $C_{10}$ hydrocarbyl, such as butyl, pentyl, hexyl, heptyl, octyl, nonyl, decyl, undecyl, dodecyl, tridecyl, tetradecyl or an isomer thereof, preferably a $C_5$, $C_6$, $C_7$, $C_8$, $C_9$ or $C_{10}$ hydrocarbyl.

In any embodiment of the invention, $R_1$ may be the same as the

group of the general formula:

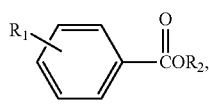

wherein $R_1$ is a saturated or unsaturated cyclic hydrocarbon, optionally substituted with an alkyl and/or an OXO-ester, and $R_2$ is a $C_4$ to $C_{14}$ hydrocarbyl, preferably the residue of a $C_4$ to $C_{14}$ OXO-alcohol.

In any embodiment of the invention described herein, $R_2$ may be the hydrocarbon residue of a $C_5$ to $C_{10}$ OXO-alcohol averaging from 0.2 to 5.0 branches per residue.

In any embodiment of the invention described herein, the hydrocarbon residue averages from 0.05 to 0.4 branches per residue at the alcoholic beta carbon.

In any embodiment of the invention described herein, the hydrocarbon residue averages at least 1.3 to 5.0 methyl branches per residue.

In any embodiment of the invention described herein, the hydrocarbon residue averages from 0.35 to 1.5 pendant methyl branches per residue.

In a preferred embodiment of the invention, compounds useful herein as first plasticizers are represented by the formula:

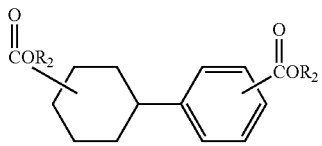

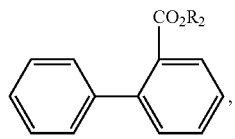

where each $R_2$ is, independently, a $C_4$ to $C_{14}$ hydrocarbyl, preferably the residue of a $C_4$ to $C_{14}$ OXO-alcohol, preferably each $R_2$ is, independently, a $C_6$ to $C_9$ hydrocarbyl, preferably a $C_6$, $C_7$, $C_8$ or $C_9$ hydrocarbyl, preferably a $C_6$, $C_7$, $C_8$ or $C_9$ alkyl, such as hexyl, heptyl, octyl or nonyl, or an isomer thereof.

In a preferred embodiment of the invention, compounds useful herein are represented by the formula:

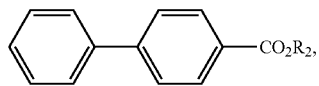

wherein $R_2$ is a $C_5$ to $C_{14}$ hydrocarbyl, preferably $R_2$ is $C_7H_{15}$, $C_9H_{19}$, $C_{10}H_{21}$, $C_{11}H_{23}$, or $C_{13}H_{27}$.

In a preferred embodiment of the invention, compounds useful herein are represented by the formula:

wherein $R_2$=a $C_5$ to $C_{14}$ hydrocarbyl, preferably $R_2$ is $C_7H_{15}$, $C_9H_{19}$, $C_{10}H_{21}$, $C_{11}H_{23}$, or $C_{13}H_{27}$.

In a preferred embodiment of the invention, compounds useful herein may be a mixture of the following at any ratio:

wherein $R_2$ is a $C_5$ to $C_{14}$ hydrocarbyl, preferably $R_2$ is $C_7H_{15}$, $C_9H_{19}$, $C_{10}H_{21}$, $C_{11}H_{23}$, or $C_{13}H_{27}$.

In a preferred embodiment of the invention, compounds useful herein are represented by the formulas:

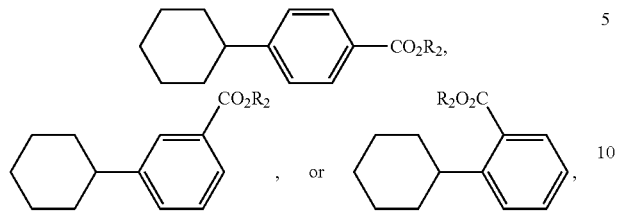

wherein $R_2$ is a $C_5$ to $C_{14}$ hydrocarbyl, preferably $R_2$ is $C_7H_{15}$, $C_9H_{19}$, $C_{10}H_{21}$, $C_{11}H_{23}$, or $C_{13}H_{27}$.

In a preferred embodiment of the invention, compounds useful herein are represented by the formulas:

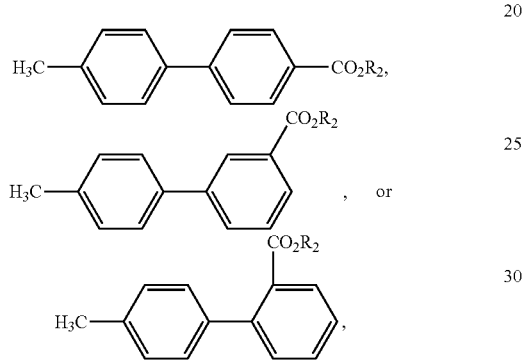

wherein $R_2$ is a $C_5$ to $C_{14}$ hydrocarbyl, preferably $R_2$ is $C_7H_{15}$, $C_9H_{19}$, $C_{10}H_{21}$, $C_{11}H_{23}$, or In a preferred embodiment of the invention, compounds useful herein are represented by the formula (or comprise a mixture of compounds represented by the formulas):

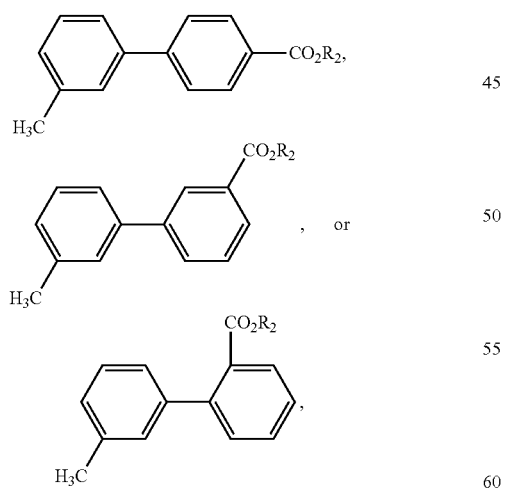

wherein $R_2$ is a $C_5$ to $C_{14}$ hydrocarbyl, preferably $R_2$ is $C_7H_{15}$, $C_9H_{19}$, $C_{10}H_{21}$, $C_{11}H_{23}$, or $C_{13}H_{27}$.

In a preferred embodiment of the invention, compounds useful herein are represented by the formula (or comprise a mixture of compounds represented by the formulas):

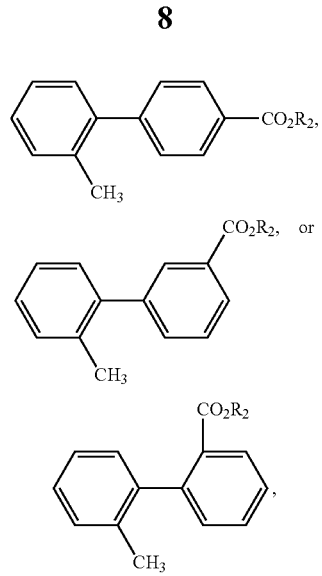

wherein $R_2$ is a $C_5$ to $C_{14}$ hydrocarbyl, preferably $R_2$ is $C_7H_{15}$, $C_9H_{19}$, $C_{10}H_{21}$, $C_{11}H_{23}$, or $C_{13}H_{27}$.

In a preferred embodiment of the invention, compounds useful herein are represented by the formula (or comprise a mixture of compounds represented by the formulas):

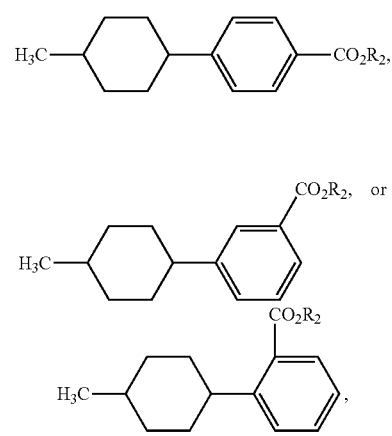

wherein $R_2$ is a $C_5$ to $C_{14}$ hydrocarbyl, preferably $R_2$ is $C_7H_{15}$, $C_9H_{19}$, $C_{10}H_{21}$, $C_{11}H_{23}$, or $C_{13}H_{27}$.

In a preferred embodiment of the invention, compounds useful herein are represented by the formula (or comprise a mixture of compounds represented by the formulas):

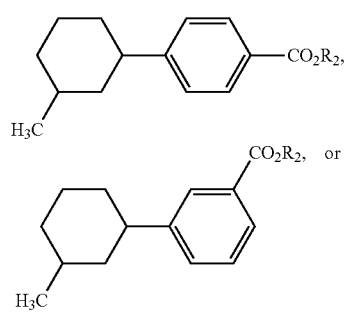

-continued

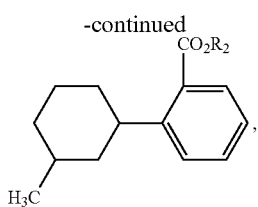

wherein $R_2$ is a $C_5$ to $C_{14}$ hydrocarbyl, preferably $R_2$ is $C_7H_{15}$, $C_9H_{19}$, $C_{10}H_{21}$, $C_{11}H_{23}$, or $C_{13}H_{27}$.

In a preferred embodiment of the invention, compounds useful herein are represented by the formula (or comprise a mixture of compounds represented by the formulas):

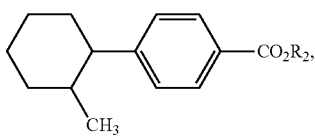

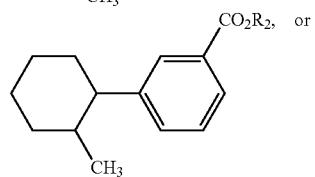

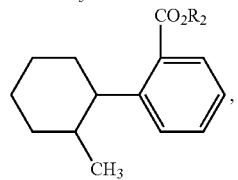

wherein $R_2$ is a $C_5$ to $C_{14}$ hydrocarbyl, preferably $R_2$ is $C_7H_{15}$, $C_9H_{19}$, $C_{10}H_{21}$, $C_{11}H_{23}$, or $C_{13}H_{27}$.

Additionally, compositions of the formulas depicted herein may be partially or fully hydrogenated, such that the final composition may contain compounds represented by the formula:

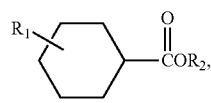

wherein $R_1$ is a saturated or unsaturated cyclic hydrocarbon, optionally substituted with an alkyl and/or an OXO-ester, and $R_2$ is a $C_4$ to $C_{14}$ hydrocarbyl, preferably the residue of a $C_4$ to $C_{14}$ OXO-alcohol, for example:

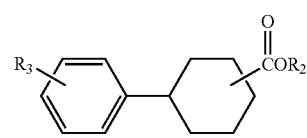

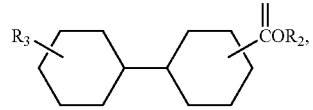

wherein $R_3$ is an alkyl and/or an OXO-ester (such as methyl or —$CO_2R_2$*), $R_2$ is a $C_4$ to $C_{14}$ hydrocarbyl, preferably the residue of a $C_4$ to $C_{14}$ OXO-alcohol, $R_2$* is a $C_4$ to $C_{14}$ hydrocarbyl, preferably the residue of a $C_4$ to $C_{14}$ OXO-alcohol, that may be the same or different as $R_2$.

In a preferred embodiment of the invention, useful compounds are represented by the formulas:

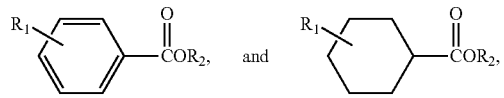

wherein each $R_1$ is, independently, a saturated or unsaturated cyclic hydrocarbon, optionally substituted with an alkyl and/or an OXO-ester, and each $R_2$ is, independently, a $C_4$ to $C_{14}$ hydrocarbyl, preferably the residue of a $C_4$ to $C_{14}$ OXO-alcohol, preferably the compound is a mixture of compounds represented by the formulas:

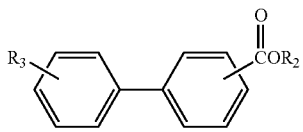

and one or more of

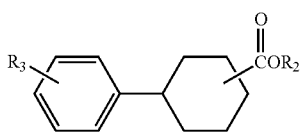

and/or

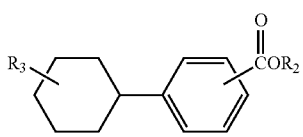

and/or

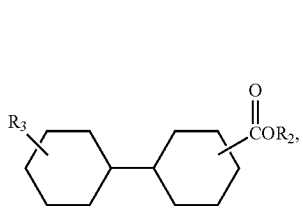

wherein each $R_3$ is, independently, an alkyl and/or an OXO-ester (such as methyl or —$CO_2R_2$*), $R_2$ is a $C_4$ to $C_{14}$ hydrocarbyl, preferably the residue of a $C_4$ to $C_{14}$ OXO-alcohol, $R_2$* is a $C_4$ to $C_{14}$ hydrocarbyl, preferably the residue of a $C_4$ to $C_{14}$ OXO-alcohol, that may be the same or different as $R_2$.

In a preferred embodiment of the invention in any formula described herein, $R_1$ is tolyl and $R_2$ is a $C_9$ or $C_{10}$ hydrocarbyl.

In a preferred embodiment of the invention in any formula described herein, $R_2$ is not linear, preferably $R_2$ is not a linear $C_4$ or $C_5$ hydrocarbyl, preferably $R_2$ is not a linear group containing 4 or 5 carbon atoms. In a preferred embodiment of the invention in any formula described herein, R$_2$ is branched or cyclic, preferably branched.

In a preferred embodiment of the invention, the first plasticizer compound useful herein may be a mixture of two, three, four or more compounds produced herein at any ratio. In an embodiment of the invention, the first compound is present at 0.1 to 99.8 wt % (preferably 1 to 98 wt %, preferably 5 to 94.9 wt %, preferably 10 to 89.9 wt %), the second compound is present at 0.1 to 99.8 wt % (preferably 1 to 98 wt %, preferably 5 to 94.9 wt %, preferably 10 to 89.9 wt %), and each additional compound is present at least 0.1 wt %, preferably at least 1 wt %, preferably at least 5 wt %, preferably at least 10 wt %, based upon the weight of the plasticizer compounds.

In a preferred embodiment of the invention, compounds useful herein are represented by the formula:

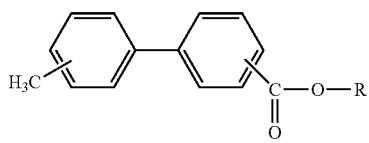

where R is a linear C$_6$ or C$_9$ hydrocarbyl, is derived from a C$_6$ or C$_9$ alcohol, or when R is the resulting structure from an OXO-alcohol, alternately R is linear and has 7, 8, 10, 11, 12 or 13 carbon atoms.

In another embodiment, in any formula described herein R$_2$ is a mixture of linear and branched hydrocarbyl groups, such as cyclic hydrocarbyl groups.

The compounds described above can be produced according to the methods described in U.S. Ser. No. 13/751,835, filed Jan. 28, 2013; U.S. Ser. No. 14/164,889, filed Jan. 27, 2014; U.S. Ser. No. 14/201,173, filed Mar. 7, 2014; U.S. Ser. No. 14/201,226, filed Mar. 7, 2014; U.S. Ser. No. 14/201,287, filed Mar. 7, 2014; U.S. Ser. No. 14/201,224, filed Mar. 7, 2014; U.S. Ser. No. 14/201,284, filed Mar. 7, 2014.

One route to produce the first plasticizers of the present disclosure is by combination of two benzene molecules, by controlled hydrogenation, as follows:

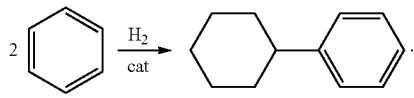

According to this method, the cyclohexyl benzene so formed can be optionally dehydrogenated to form biphenyl as follows:

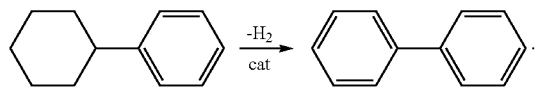

In either case, the aromatic ring(s) are subsequently alkylated with an alcohol, such as methanol, which acts to add one or more methyl groups to the ring(s), followed by oxygenation of the pendant methyl group(s) to form carboxylic acid group(s), and subsequently esterified with an alcohol, ROH, to form the mono- or diesters described herein and subsequently hydrogenated with an hydrogen over hydrogenation catalyst, to form one or more saturated rings:

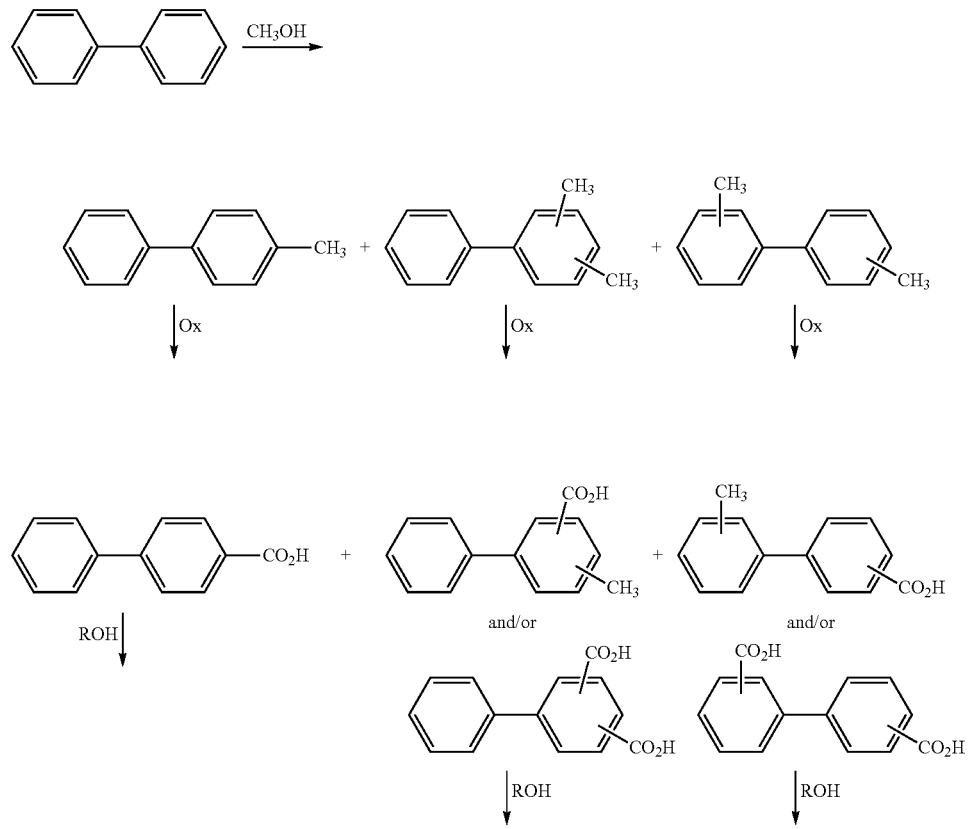

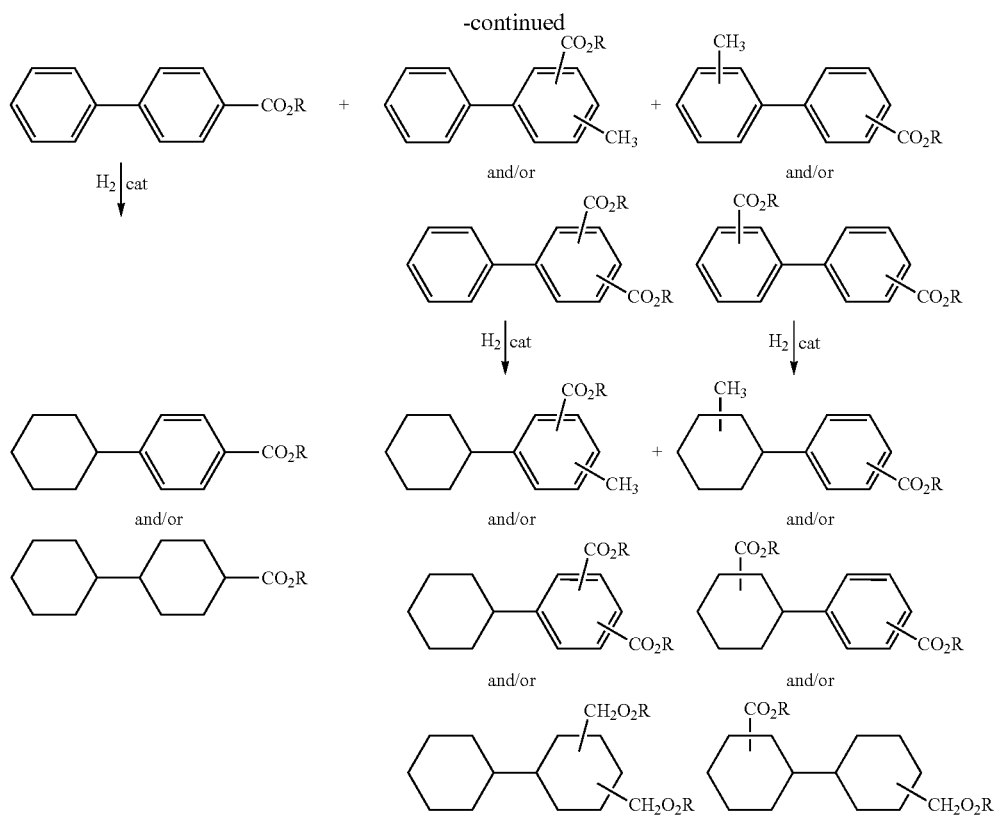

wherein ROH is a branched alcohol, preferably an OXO-alcohol, even more preferably a $C_4$ to $C_{14}$ OXO-alcohol.

Another route to produce the first plasticizers described herein is by oxidative coupling of two benzene molecules to form biphenyl, as follows: For benzene coupling: Ukhopadhyay, Sudip; Rothenberg, Gadi; Gitis, Diana; Sasson, Yoel. Casali Institute of Applied Chemistry, Hebrew University of Jerusalem, Israel. Journal of Organic Chemistry (2000), 65(10), pp. 3107-3110. Publisher: American Chemical Society, incorporated herein by reference.

Similarly to the first process, the biphenyl molecule is then alkylated, for example, with an alcohol, such as methanol, to add one or more methyl groups to the ring(s), followed by oxygenation of the pendant methyl group(s) to form carboxylic acid group(s), and subsequently esterified with an alcohol, ROH, to form the mono- or diesters described herein and subsequently hydrogenated with an hydrogen over hydrogenation catalyst, to form one or more saturated ring.

Of course, a similar process can be followed utilizing an alkyl aromatic, such as toluene as the starting material in place of benzene:

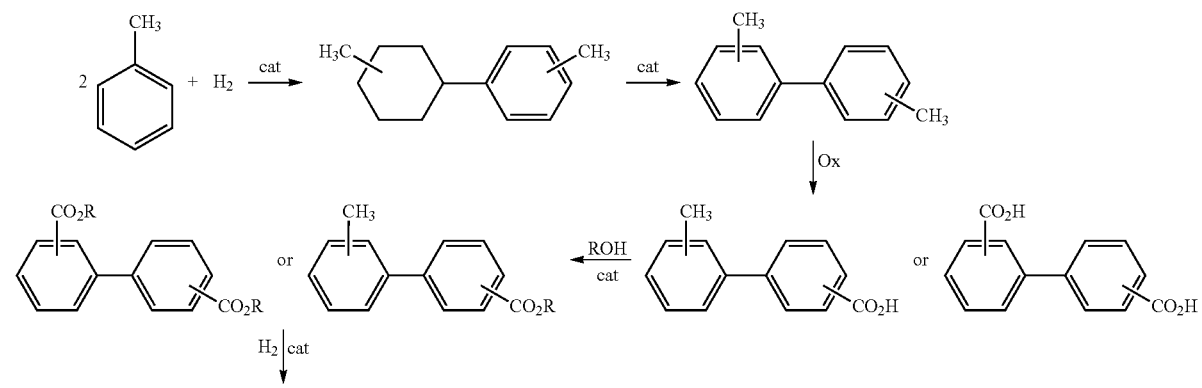

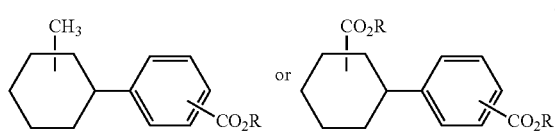 or 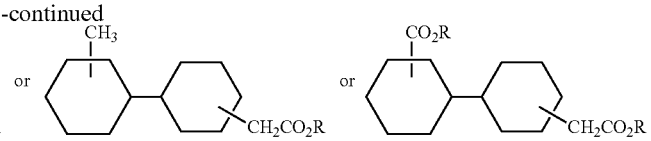 or wherein ROH is a branched alcohol, preferably an OXO-alcohol, even more preferably a $C_4$ to $C_{14}$ OXO-alcohol. Either monoesters or diesters can be formed, or both, depending on reaction conditions. Likewise, by appropriate control of the oxidation step so as to oxidize only one of the pendant methyl groups, monoester compounds of the following general formula can be formed:

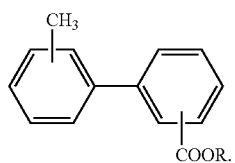

Alternatively, one mole of toluene can be hydrogenated to form methyl cyclohexene, and then the methyl cyclohexene used to alkylate another mole of toluene, followed by dehydrogenation to form dimethyl biphenyl.

In a more preferred embodiment, the resulting alkylated aromatic compound is oxidized to acid/diacid, then esterified with OXO-alcohols, which are mixed linear and branched alcohol isomers, the formation of which is described in more detail below.

"OXO-alcohols" are isomeric mixtures of branched, organic alcohols. "OXO-esters" are compounds having at least one functional ester moiety within its structure derived from esterification of a carboxylic acid portion or moiety of a compound with an OXO-alcohol.

OXO-alcohols can be prepared by hydroformylating olefins, followed by hydrogenation to form the alcohols. "Hydroformylating" or "hydroformylation" is the process of reacting a compound having at least one carbon-carbon double bond (an olefin) in an atmosphere of carbon monoxide and hydrogen over a cobalt or rhodium catalyst, which results in addition of at least one aldehyde moiety to the underlying compound. U.S. Pat. No. 6,482,972, which is incorporated herein by reference in its entirety, describes the hydroformylation (OXO) process. The resulting OXO-alcohols consist of multiple isomers of a given chain length due to the various isomeric olefins obtained in the oligomerization process, described below, in tandem with the multiple isomeric possibilities of the hydroformylation step.

Typically, the isomeric olefins are formed by light olefin oligomerization over heterogeneous acid catalysts, such as by propylene and/or butene oligomerization over solid phosphoric acid or zeolite catalysts. The light olefins are readily available from refinery processing operations. The reaction results in mixtures of longer-chain, branched olefins, which are subsequently formed into longer chain, branched alcohols, as described below and in U.S. Pat. No. 6,274,756, incorporated herein by reference in its entirety. Olefins for hydroformylation can also be prepared by dimerization of propylene or butenes through commercial processes such as the IFP Dimersol™ process or the Huls (Evonik) Octol™ process.

Branched aldehydes are then produced by hydroformylation of the isomeric olefins. The resulting branched aldehydes can then be recovered from the crude hydroformylation product stream by fractionation to remove unreacted olefins. These branched aldehydes can then be hydrogenated to form alcohols (OXO-alcohols). Single carbon number alcohols can be used in the esterification of the acids described above, or differing carbon numbers can be used to optimize product cost and performance requirements. The "OXO" technology provides cost advantaged alcohols. Other options are considered, such as hydroformylation of $C_4$-olefins to $C_5$-aldehydes, followed by hydrogenation to $C_5$-alcohols, or aldehyde dimerization followed by hydrogenation to $C_{10}$ alcohols.

"Hydrogenating" or "hydrogenation" is addition of hydrogen ($H_2$) to a double-bonded functional site of a molecule, such as in the present case the addition of hydrogen to the aldehyde moieties of a di-aldehyde, to form the corresponding di-alcohol, and saturation of the double bonds in an aromatic ring. Conditions for hydrogenation of an aldehyde are well-known in the art and include, but are not limited to temperatures of 0-300° C., pressures of 1-500 atmospheres, and the presence of homogeneous or heterogeneous hydrogenation catalysts such as, but not limited to Pt/C, Pt/$Al_2O_3$ or Pd/$Al_2O_3$ and Ni. Useful hydrogenation catalysts include platinum, palladium, ruthenium, nickel, zinc, tin, cobalt, or a combination of these metals, with palladium being particularly advantageous.

Alternatively, the OXO-alcohols can be prepared by aldol condensation of shorter-chain aldehydes to form longer chain aldehydes, as described in U.S. Pat. No. 6,274,756, followed by hydrogenation to form the OXO-alcohols.

"Esterifying" or "esterification" is reaction of a carboxylic acid moiety, such as an anhydride, carboxylic acid, or an acid chloride, with an organic alcohol moiety to form an ester linkage. Another way to make esters of longer chain alcohols (such as Oxo alcohols) is to transesterify esters of "smaller" alcohols, such as those from methyl esters. Esterification conditions are well-known in the art and include, but are not limited to, temperatures of 0-300° C., and the presence or absence of homogeneous or heterogeneous esterification catalysts such as Lewis or Brönsted acid catalysts or organic titanates, such as tetraisopropyl titanate, Ti(O$C_3H_7$)$_4$, tetraisobutyl titanate, or tetraisooctyl titanate.

In a preferred embodiment, the first plasticizer compounds of the formula:

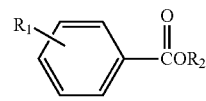

wherein $R_1$ is a cyclic hydrocarbon optionally substituted with an alkyl and/or an OXO-ester, and $R_2$ is a hydrocarbon residue of a $C_4$ to $C_{14}$ OXO-alcohol, can be produced by a process comprising the steps of: reacting benzene or alkylated benzene under conditions appropriate to form alkylated biphenyl; optionally alkylating biphenyl to form said alkylated biphenyl; oxidizing the alkyl group(s) on said alkylated biphenyl to form at least one acid group; and reacting said acid group(s) with an OXO-alcohol under esterification conditions to form said compounds.

In a preferred embodiment of the invention, the reacting step is conducted with benzene, and said optional alkylating step is conducted with an alcohol (such as methanol).

In a preferred embodiment of the invention, the alkylating step is conducted in the presence of an acid catalyst.

In a preferred embodiment of the invention, the reacting step is conducted with benzene, further comprising the steps of: hydroalkylating benzene by reacting benzene in the presence of $H_2$ to hydrogenate one mole of said benzene to form cyclohexene, alkylating benzene with said cyclohexene to form cyclohexylbenzene; dehydrogenating said cyclohexylbenzene to form biphenyl; and alkylating one or both aromatic moieties of said biphenyl to form said alkylated biphenyl, where preferably the hydroalkylating step is conducted in the presence of a hydrogenation catalyst, the alkylating step is conducted with an alkylation catalyst, and the dehydrogenating step is conducted with a dehydrogenation catalyst.

In a preferred embodiment of the invention, the hydrogenation catalyst is selected from the group consisting of platinum, palladium, ruthenium, nickel, zinc, tin, cobalt, or a combination of these metals, with palladium being particularly advantageous; the alkylation catalyst is selected from the group consisting of zeolite, mixed metal oxides and the dehydrogenation catalyst is selected from the group consisting of platinum, pladium, Ru, Rh, nickel, zinc, tin, cobalt and combinations thereof.

In a preferred embodiment of the invention, the reacting step is conducted with benzene in the presence of oxygen and an oxidative coupling catalyst, forming biphenyl, further comprising the step of alkylating one or both aromatic moieties of said biphenyl to form said alkylated biphenyl, preferably the alkylating step is conducted with an alkylation catalyst.

In a preferred embodiment of the invention, the reacting step is conducted with toluene, further comprising the steps of reacting toluene in the presence of $H_2$ and a hydrogenation catalyst to form methyl cyclohexene; reacting said methyl cyclohexene with toluene in the presence of an alkylation catalyst to form dimethyl cyclohexylbenzene; and dehydrogenating said dimethyl cyclohexylbenzene in the presence of a dehydrogenation catalyst to form the alkylated biphenyl, which is preferably dimethyl-biphenyl.

In a preferred embodiment of the invention, after reacting the acid group(s) with an OXO-alcohol under esterification conditions, the reaction product is contacted with a basic solution such as saturated sodium bicarbonate or a caustic soda wash.

In a preferred embodiment of the invention, the methyl ester of the acid is transesterified with an OXO-alcohol, such as a C4 to C14 OXO-alcohol. This facilitates separation to high purity product.

In a preferred embodiment of the invention, the crude ester is further stripped to remove excess alcohol and the stripped plasticizer is treated with activated carbon to improve the liquid volume resistivity of the plasticizer.

As discussed above, the resulting OXO-alcohols can be used individually or together in alcohol mixtures having different chain lengths, or in isomeric mixtures of the same carbon chain length to make mixed esters for use as plasticizers. This mixing of carbon numbers and/or levels of branching can be advantageous to achieve the desired compatibility with PVC for the respective core alcohol or acid used for the polar moiety end of the plasticizer, and to meet other plasticizer performance properties. The preferred OXO-alcohols are those having from 5 to 13 carbons, more preferably $C_5$ to $C_{11}$ alcohols, and even more preferably $C_6$ to $C_{10}$ alcohols.

In one embodiment, the preferred OXO-alcohols are those which have an average branching of from 0.2 to 5.0 branches per molecule, and from 0.35 to 5.0 methyl branches per molecule, or even from 1.3 to 5.0 methyl branches per molecule. In a more preferred embodiment, the alcohols have from 0.05 to 0.4 branches per residue at the alcoholic beta carbon.

Typical branching characteristics of OXO-alcohols are provided in Table 1, below.

TABLE 1

$^{13}$C NMR Branching Characteristics of Typical OXO-Alcohols.

| OXO-Alcohol | Avg. Carbon No. | % of α-Carbons w/ Branches[a] | β-Branches per Molecule[b] | Total Methyls per Molecule[c] | Pendant Methyls per Molecule[d] | Pendant Ethyls per Molecule |
|---|---|---|---|---|---|---|
| C4[e] | 4.0 | 0 | 0.35 | 1.35 | 0.35 | 0 |
| C5[f] | 5.0 | 0 | 0.30 | 1.35 | 0.35 | 0 |
| $C_6$ | — | — | — | — | — | — |
| $C_7$ | 7.2 | 0 | 0.13 | 2.2 | — | 0.04 |
| $C_8$ | 8.0 | 0 | 0.08 | 2.6 | — | — |
| $C_9$ | 9.3 | 0 | 0.09 | 3.1 | — | — |
| $C_{10}$ | 10.1 | 0 | 0.08 | 3.1 | — | — |
| $C_{12}$ | 11.8 | 0 | 0.09 | 3.9 | — | — |
| $C_{13}$ | 12.7 | 0 | 0.09 | 3.9 | — | — |

— Data not available.
[a]—COH carbon.
[b]Branches at the —CCH$_2$OH carbon.
[c]This value counts all methyl groups, including $C_1$ branches, chain end methyls, and methyl endgroups on $C_2$+ branches.
[d]$C_1$ branches only.
[e]Calculated values based on an assumed molar isomeric distribution of 65% n-butanol and 35% isobutanol (2-methylpentanol).
[f]Calculated values based on an assumed molar isomeric distribution of 65% n-pentanol, 30% 2-methylbutanol, and 5% 3-methylbutanol.

In a preferred embodiment of the invention, the alcohol (such as an OXO-alcohol) has 2.0 to 3.5 methyl branches per molecule, typically 2.1 to 3.3.

In general, for every polymer to be plasticized, a plasticizer is required with a good balance of polarity or solubility, volatility and viscosity to have acceptable plasticizer compatibility with the resin. In particular, if the 20° C. kinematic viscosity is higher than 250 mm²/sec as measured by ASTM D 445, or alternately if the 20° C. cone-and-plate viscosity is higher than 250 cP, this will affect the plasticizer processability during formulation, and can require heating the plasticizer to ensure good transfer during storage and mixing of the polymer and the plasticizer. Volatility is also an important factor which affects the ageing or durability of the plasticized polymer. Highly volatile plasticizers will diffuse and evaporate from the plastic resin matrix, thus losing mechanical strength in applications requiring long term stability/flexibility. Relative plasticizer loss from a resin matrix due to plasticizer volatility can be roughly predicted by neat plasticizer weight loss at 220° C. using Thermogravimetric Analysis or by neat plasticizer weight loss after heating the plasticizer for 24 hours at 155° C. in a forced ventilated oven (ASTM D2288).

We have found that when $C_4$ to $C_{14}$ OXO-alcohols are used as reactants for the esterification reactions described above, the resulting OXO-esters, when combined with one or more plasticizers selected from the group consisting of alkyl terephthalates, alkyl phthalates, alkyl benzoate esters, di-benzoate esters, esters of cyclohexane polycarboxylic acids, dialkyl adipates, and dibenzoic esters of glycols, provide useful plasticizer compositions which are readily incorporated into polymer formulations.

Any of the esters can have $R_1$ and $R_2$ which contain mixed alkyl isomer residues of $C_4$ to $C_{14}$ OXO-alcohols can be combined with one or more plasticizers selected from the group consisting of alkyl terephthalates, alkyl phthalates, alkyl benzoate esters, di-benzoate esters, esters of cyclohexane polycarboxylic acids, dialkyl adipates, and dibenzoic esters of glycols; and used as plasticizers for polymers, such as vinyl chloride resins, polyesters, polyurethanes, biopolymers, silylated polymers, polysulfides, acrylics, ethylene-vinyl acetate copolymer, rubbers, thermoplastic polyolefins (TPO), poly(meth)acrylics and combinations thereof, preferably polyvinylchloride.

Second Plasticizers

In a preferred embodiment, this invention relates to polymer composition comprising a thermoplastic polymer and at least one first plasticizer of the formula:

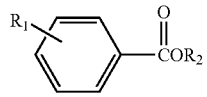

wherein $R_1$ is a saturated or unsaturated cyclic hydrocarbon optionally substituted with an alkyl and/or an OXO-ester, and $R_2$ is a $C_4$ to $C_{14}$ hydrocarbyl or the hydrocarbon residue of a $C_4$ to $C_{14}$ OXO-alcohol, and at least one or more (such as one, two, three, four, five or more) second plasticizers comprising alkyl terephthalate, alkyl phthalate, alkyl benzoate ester, di-benzoate ester, ester of cyclohexane polycarboxylic acid, dialkyl adipate, or mixtures thereof, preferably the second plasticizers is selected from the group consisting of alkyl terephthalates, alkyl phthalates, alkyl benzoate esters, di-benzoate esters, esters of cyclohexane polycarboxylic acids, dialkyl adipates, and mixtures thereof.

Useful second plasticizers include alkyl terephthalates (preferably $C_4$ to $C_{12}$ alkyl terephthalates) such as di-n-butyl terephthalate, diisobutyl terephthalate, di-n-octyl terephthalate, diisooctyl terephthalate, di-2-ethylhexyl terephthalate, di-n-nonyl terephthalate, diisononyl terephthalate, di-n-decyl terephthalate, di-2-propyl heptyl terephthalate, and diisodecyl terephthalate.

Useful second plasticizers also include the alkyl phthalates (preferably $C_4$ to $C_{40}$ alkyl, preferably $C_4$ to $C_{14}$ alkyl) and alkyl isophthalates (preferably $C_4$ to $C_{40}$ alkyl, preferably $C_4$ to $C_{14}$ alkyl) such as di-n-nonyl phthalate, diisononyl phthalate, di-n-decyl phthalate, diisodecyl phthalate, di-2-propyl heptyl phthalate, di-n-undecyl phthalate, ditridecyl phthalate, diisotridecyl phthalate, di-n-propyl isophthalate, di-n-nonyl isophthalate, diisononyl isophthalate, di-n-decyl isophthalate, diisodecyl isophthalate, di-2-propyl heptyl isophthalate, di-n-undecyl isophthalate, and diisotridecyl isophthalate.

Useful second plasticizers also include alkyl benzoate esters having from 7 to 13 carbon atoms in the alkyl moiety, preferably $C_9$ to $C_{13}$, preferably isononyl benzoate, nonyl benzoate, isodecyl benzoate, decyl benzoate, 2-propylheptyl benzoate, isoundecyl benzoate, and isotridecyl benzoate.

Useful second plasticizers also include esters of cyclohexane polycarboxylic acids (including alkyl 1,2-cyclohexanedicarboxylates, alkyl 1,3-cyclohexanedicarboxylates and alkyl 1,4-cyclohexanedicarboxylates) preferably having 4 to 13 carbons in the side chain, preferably 7 to 10 carbons in the side chain, preferably di-heptyl cylohexanoate, di-2-ethylhexyl cylochexanoate, di-n-nonyl cylochexanoate, diisononyl cylochexanoate, di-n-decyl cylochexanoate, diisodecyl cylochexanoate, and di-2-propyl heptyl cylochexanoate.

Useful second plasticizers also include dialkyl adipates having 4 to 13 carbon atoms preferably having 7 to 10 carbons in the alkyl moiety, preferably diheptyl adipate, dioctyl adipate, diisononyl adipate, diisodecyl adipate, and di 2-propylheptyl adipate.

Useful second plasticizers also include dibenzoate esters (also referred to as dibenzoic esters of glycols), preferably dipropylene glycol dibenzoate, diethyleneglycol dibenzoate, triethylene glycol dibenzoate and mixtures of dipropylene, diethylene and triethylene glycol dibenzoates.

Examples of commercially available benzenepolycarboxylic acid esters useful herein include phthalates such as: Palatinol™ AH (Di-(2-ethylhexyl) phthalate; Palatinol™ N (Diisononyl phthalate); Vestinol™ 9 (Diisonyl phthalate); Palatinol™ Z (Diisodecyl phthalate); Palatinol™ 10-P (Di-(2-Propylheptyl) phthalate); Palatinol™ 711P (Heptylundecyl phthalate); Palatinol™ 911 (Nonylundecyl phthalate); Palatinol™ 11P-E (Diundecyl phthalate); Palatinol™ 11P-E; Jayflex™ DINP; Jayflex™ DIDP; Jayflex™ DIUP; Jayflex™ DTDP; and Emoltene™ 100.

Examples of cyclohexane polycarboxylic acid esters useful herein include: Hexamoll DINCH™ (diisonyl cyclohexanoate); Elatur™ CH (diisonyl cyclohexanoate); Nan Ya™ DPEH (bis(2-ethyl hexyl)cyclohexanoate); and Nan Ya™ DPIN (diisononyl cyclohexanoate).

Examples of commercially available adipates useful herein include: Plastomoll™ DOA (diisononyl adipate); Oxsoft™ DOA; Eastman™ DOA (di-(2-ethylhexyl) adipates); and Plastomoll™ DNA (diisononyl adipate).

Examples of commercially available alkyl benzoates useful herein include: Vestinol™ INB (isononyl benzoate); Jayflex™ MB10 (isodecyl benzoate); Benzoflex™ 131 (isodecyl benzoate); and Uniplex™ 131 (isodecyl benzoate).

Particularly useful examples of useful plasticizers include the commercially available terephthalates such as Eastman 168™; OXSOFT GPO™; and LGFLEX GL™ 300 (bis(2-ethylhexyl) terephthalate).

Particularly useful examples of useful plasticizers include the commercially available di-benzoate plasticizer mixtures such as: Benzoflex™ 988; Benzoflex™ 2088; Kflex™ 500; and Santicizer™ 9000 series.

Particularly useful second plasticizers include: dialkyl (ortho)phthalate, preferably having 4 to 13 carbon atoms in the alkyl chain; trialkyl trimellitates, preferably having 4 to 10 carbon atoms in the side chain; dialkyl adipates, having 4 to 13 carbon atoms; dialkyl terephthalates each preferably having 4 to 8 carbon atoms and more particularly 4 to 7 carbon atoms in the side chain; alkyl 1,2-cyclohexanedicarboxylates, alkyl 1,3-cyclohexanedicarboxylates and alkyl 1,4-cyclohexanedicarboxylates, and preferably here alkyl 1,2-cyclohexanedicarboxylates each preferably having 4 to 13 carbon atoms in the side chain; dibenzoic esters of glycols; and alkyl benzoates, preferably having 7 to 13 carbon atoms in the alkyl chain.

The polymer composition comprising a thermoplastic polymer and at least one plasticizer blend described herein may optionally contain further additional plasticizers other than those described above, such as: dialkyl sebacates preferably having 4 to 13 carbon atoms; dialkyl azelates preferably having 4 to 13 carbon atoms; alkylsulfonic esters of phenol with preferably one alkyl radical containing 8 to 22 carbon atoms; polymeric plasticizers (based on polyester in particular), glyceryl esters, acetylated glycerol esters, epoxy estolide fatty acid alkyl esters, citric triesters such as tributylacetyl citrate having a free or carboxylated OH group and for example alkyl radicals of 4 to 9 carbon atoms; tri-2-ethylhexyl phosphate, trioctyl phosphate such as 2-ethylhexyl-isodecyl phosphate, di-2-ethylhexyl phenyl phosphate, triphenyl phosphate, tricresyl phosphate; high chlorine content chlorinated paraffins, alkylpyrrolidone derivatives having alkyl radicals of 4 to 18 carbon atoms and also polyester platicizers, such as pentaerythritol ester of C5 (valeric) to C9 (pelargonic) acids. In all instances, the alkyl radicals can be linear or branched and the same or different.

We have found that when the cyclohexanedicarboxylates are used as the second plasticizer in the blend with the first plasticizer of the present invention, the resulting mixture provides better low temperature flexibility, lower neat viscosity, lower density, lower hardness and plasticizer mix with improved gelation over pure alkyl cyclohexanedicarboxylates like DINCH®. This will enhance the flexible PVC processing by reducing dry blending time (mix with S—PVC) or reducing neat plastisol viscosity with lower plastisol gelation and curing temperature.

We have also found that when alkyl adipates are used as the second plasticizer, they provide a plasticizer blend with lower neat viscosity and exhibit improved cold flex properties while retaining acceptable heat ageing performance (lower weight loss). Cold flexibility leads to improved service temperature range and is particularly useful in the production of articles used at low that require retaining their flexibility at negative temperatures. Improved cold flexibility is particularly useful in applications such as sheets, roofing, tarpaulins and tents, protective films including food wrap films, wire and cable, coated fabrics, shoes and medical applications, such as blood bags and tubing.

It is also highly desirable to be able to reduce plastisol viscosity and gelation during processing. Plastisol viscosity control is important in the conversion of these plastisols into useful products. For example in the preparation of vinyl floor coverings, the plastisol is spread on a surface moving at around 15 to 25 meters per minute in several layers so that the floor covering is literally built up. Typically these layers include a foam core, a decorative layer and a clear protective wear layer. The multilayer products are first gelled by contact with a heated roll and then cured in an oven where they are fused (gelled) at a temperature of from 180° C. to 200° C. Often the gelation is reached after the spreading of each individual layer, starting with the base or encapsulation layer. After the gelation, the next layer can be spread. When all layers have been spread, the product is then passed into an oven to obtain full fusion of all layers together and adequate expansion of the foamed layers.

Figure 2:
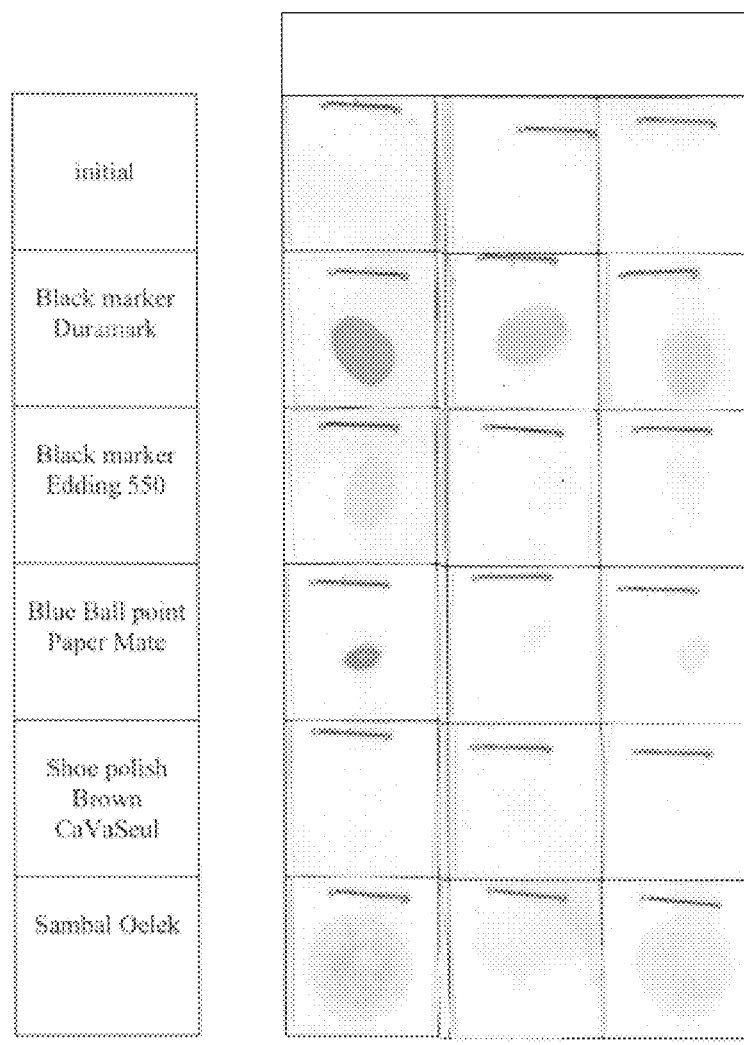
FIG. 2 highlights the stain resistance results for various formulations containing the plasticizer mixture of the present invention.

We also found that when alkyl benzoates are used as the second plasticizers, the workability of PVC plastisols is improved under shear (the plasticizer blend with reduced neat viscosity yield lower plastisol viscosity with good viscosity stability) without encountering the problem of increasing the level of visco depressants and the emissions of volatile organic compounds (VOC). Significant improvement of the plastisol gelation temperature over conventional, general purpose, plasticizers is observed and shown in Examples 5 and 6. Stain resistance was also improved as shown in FIG. 2 (left column is Example 5.1, middle column is Example 5.2 and right column is Example 5.3).

The use of esters of alkyl cyclohexanedicarboxylates or terepthalates as plasticizers for polyvinyl chloride can result in a substantial increase in the temperature required for gelation compared to compositions based on comparable phthalates.

Accordingly in a further embodiment of the invention, the first plasticizer, being a fast fusing plasticizer (a plasticizer with low solution temperature), when mixed with one or more of the second plasticizers described herein will improve the gelation of the composition containing such blends (typically by at least 10%, preferably 20% as compared to the same blend without the plasticizer 1 component).

Typical formulations including the plasticizer blend of the present invention could be, in parts by weight:
 a) Thermoplastic polymer (such as PVC or PVC copolymer) 100 phr (parts per hundreds of polymer);
 b) First Plasticizer(s) (25-85 phr, alternately 30-70 phr, alternately 35-65 phr);
 c) Second Plasticizer(s) (5-55 phr, alternately 5-45 phr, alternately 10-35 phr);
 d) Filler (0-150 phr, alternately 2-100 phr, alternately 3-80 phr); and
 e) Stabilizer (1-10 phr, alternately 2-8 phr, alternately 4-6 phr).

Alternatively, typical formulations for use in the production of automotive underbody sealants which typically have high plasticizer and high filler could be, in parts by weight:
 a) Thermoplastic polymer (such as PVC and/or PVC copolymer) 100 phr (preferably combinations of PVC and PVC copolymer);
 b) First Plasticizer(s) (50-100 phr, alternately 60-90 phr, alternately 65-85 phr);
 c) Second Plasticizer(s) (15-45 phr, alternately 20-40 phr, alternately 25-35 phr);
 d) Filler, such as calcium carbonate, (60-200 phr alternately 70-150 phr, alternately 80-120 phr); and
 e) Stabilizer and other additives (0-10 phr, alternately 2-8 phr, alternately 3-6 phr).

As a further embodiment formulations for the production of calendered floor tiles could be, in parts by weight:
 a) Thermoplastic polymer (such as PVC and/or PVC copolymer) 100 phr (preferably combinations of PVC and PVC copolymer);
 b) First Plasticizer(s) (20-60 phr, alternately 25-55 phr, alternately 35-45 phr);
 c) Second Plasticizer(s) (5-50 phr, alternately 10-35 phr, alternately 15-30 phr);
 d) Epoxidized soybean oil (0-6 phr, alternately 1-5 phr, alternately 2-4 phr);

e) Filler, such as CaCO$_3$, (200 to 800 phr, alternately 400-700 phr, alternately 500-600 phr); and
f) Pigments, stabilizers, other additives (0-10 phr).

As a further embodiment, formulations for the production of wire and cable (insulation, filling compound, sheathing, etc.) could be, in parts by weight:
a) Thermoplastic polymer (such as PVC and/or PVC copolymer) 100 phr (preferably combinations of S—PVC and PVC copolymer);
b) First Plasticizer(s) (35-95 phr, alternately 30-80 phr, alternately 40-70 phr);
c) Second Plasticizer(s) (5-35 phr, alternately 5-30 phr, alternately 10-25 phr);
d) Filler, such as CaCO$_3$, (60 to 600 phr, alternately 70-500 phr, alternately 80-150 phr); and
e) Stabilizers, other additives (0-20 phr, alternately 5-15 phr, alternately 5-10 phr).

The present invention, therefore, further provides the use of from 20 to 120 phr (parts per 100 parts of thermoplastic polymer, such as polyvinyl chloride), from 30 to 90, more preferably from 40 to 80, more preferably from 50 to 70 phr of a plasticizer composition containing a mixture of one or more first plasticizer(s) and one or more second plasticizer(s) to improve the processability of a thermoplastic polymer (such as polyvinyl chloride) formulation, especially in cold temperature flexibility and plasticizer weight loss (volatility). In a further embodiment, the present invention provides a plasticized polyvinyl chloride composition for use in pelletizing, extrusion, injection molding or calendering.

In a further embodiment, this invention provides extruded or injection molded articles obtained from a plasticized thermoplastic polymer, such as polyvinyl chloride, composition containing from 20 to 100, preferably from 30 to 90, more preferably from 40 to 80, more preferably from 50 to 70 parts by weight of the plasticizer blend of the present invention.

We have also found that the use of the plasticizer mixtures of the present invention as plasticizers for polyvinyl chloride also results in shorter dry blending times of polyvinyl chloride compositions. This improved processability is particularly useful in the transformation of the plasticized polyvinyl chloride composition including, for example, pelletizing, extrusion, injection molding and calendering. Calendering is used in applications such as the production of roofing, protective films including stationery. Extrusion is used in the production of films, pipes, guttering and wire and cable coatings. Injection molding is used in the production of shoes, toys and the like.

Accordingly, in a further embodiment of the invention, a blend of the first and second plasticizers described herein when combined with a thermoplastic polymer (such as PVC) will improve the gelation of the composition containing such blends (typically by at least 5%, preferably at least 10%, preferably at least 15%, preferably at least 20% as compared to the same blend without the first plasticizer component).

Accordingly, in a further embodiment of the invention, a blend of the first and second plasticizers described herein when combined with a thermoplastic polymer (such as PVC) will reduce the viscosity of the composition containing such blends (typically by at least 5%, preferably at least 10%, preferably at least 15%, preferably at least 20% as compared to the same blend without the first plasticizer component).

Accordingly, in a further embodiment of the invention, a blend of the first and second plasticizers described herein when combined with a thermoplastic polymer (such as PVC) will reduce the density of the composition containing such blends (typically by at least 5%, preferably at least 10%, preferably at least 15%, preferably at least 20% as compared to the same blend without the first plasticizer component).

Accordingly, in a further embodiment of the invention, a blend of the first and second plasticizers described herein when combined with a thermoplastic polymer (such as PVC) will reduce the Shore A hardness (ASTM D 2240-86) of the composition containing such blends (typically by at least 5%, preferably at least 10%, preferably at least 15%, preferably at least 20% as compared to the same blend without the first plasticizer component).

Accordingly, in a further embodiment of the invention, a blend of the first and second plasticizers described herein when combined with a thermoplastic polymer (such as PVC) will reduce the Shore D (ASTM D 2240-86) hardness of the composition containing such blends (typically by at least 5%, preferably at least 10%, preferably at least 15%, preferably at least 20% as compared to the same blend without the first plasticizer component).

Thermoplastic Polymers

Preferably, the thermoplastic polymer is selected from the group consisting of vinyl chloride resins, polyesters, polyurethanes, ethylene-vinyl acetate copolymer, rubbers, poly (meth)acrylics and combinations thereof, alternately the polymer is selected from the group consisting of polyvinyl chloride (PVC), polyvinylidene chloride, a copolymer of polyvinyl chloride and polyvinylidene chloride, and polyalkyl methacrylate (PAMA), preferably, the polymer is a copolymer of vinyl chloride with at least one monomer selected from the group consisting of vinylidene chloride, vinyl acetate, vinyl propionate, vinyl butyrate, vinyl benzoate, methyl acrylate, ethyl acrylate, and butyl acrylate.

In any embodiment of the invention, in the polymer composition comprising a thermoplastic polymer and at least two plasticizers (at least one first plasticizer and at least one second plasticizer), the total amount of all plasticizers is from 5 to 90 wt %, based upon the weight of the polymer and plasticizer, preferably from 10 to 85 wt %, even more preferably in the range from 15 to 80 wt %, preferably in the range from 20 to 75 wt %.

In any embodiment, the mixture of first and second plasticizers comprises from 1 to 99 wt % (preferably from 5 to 90 wt %, preferably 10 to 80 wt %) of at least one first plasticizer and from 99 to 1 wt % (preferably from 95 to 10 wt %, preferably 90 to 20 wt %) of at least one second plasticizer, based upon the weight of the plasticizers.

The polymer composition comprising a thermoplastic polymer and at least two plasticizers (at least one first plasticizer and at least one second plasticizer) described herein may further contain additives to optimize the chemical, mechanical or processing properties, said additives being more particularly selected from the group consisting of fillers, clays, nanoparticles, fibers, such as calcium carbonate, titanium dioxide or silica, carbon fibers, clays, pigments, thermal stabilizers, antioxidants, UV stabilizers, lubricating or slip agents, flame retardants, antistatic agents, biocides, impact modifiers, blowing agents, (polymeric) processing aids, viscosity depressants or regulators such as thickener and thinners, antifogging agents, optical brighteners, etc.

Thermal stabilizers useful herein include all customary polymer stabilizers, especially PVC stabilizers in solid or liquid form, examples are those based on Ca/Zn, Ba/Zn, Pb, Sn or on organic compounds (OBS), and also acid-binding phyllosilicates such as hydrotalcite. The mixtures to be used according to the present invention may have a thermal stabilizer content of 0.5 to 10, preferably 0.8 to 5 and more preferably 1.0 to 4 wt %, based upon the weight of the polymer composition.

It is likewise possible to use costabilizers with plasticizing effect in the polymer composition comprising a thermoplastic polymer and at least one plasticizer as described herein, in particular epoxidized vegetable oils, such as epoxidized linseed oil or epoxidized soya oil.

Antioxidants are also useful in the polymer composition comprising a thermoplastic polymer and at least two plasticizers (at least one first plasticizer and at least one second plasticizer) as described herein and can include sterically hindered amines—known as HALS stabilizers, sterically hindered phenols, such as Topanol™ CA, phosphites, UV absorbers, e.g. hydroxybenzophenones, hydroxyphenylbenzotriazoles and/or aromatic amines. Suitable antioxidants for use in the compositions of the present invention are also described for example in "Handbook of Vinyl Formulating" (editor: R. F. Grossman; J. Wiley & Sons; New Jersey (US) 2008). The level of antioxidants in the mixtures of the present invention is typically not more than 10 phr, preferably not more than 8 phr, more preferably not more than 6 phr and even more preferably between 0.01 and 5 phr (phr=parts per hundred parts of polymer). The antioxidant can also be mixed with the plasticizer for better dispersion and stabilizing efficiency. The level of antioxidants in the plasticizer blends of the present invention is typically not more than 0.5 wt % of the total plasticizer weight, more preferably not more than 0.3 wt %, more preferably between 0.1 and 0.3 wt %.

Organic and inorganic pigments can be also used in the polymer composition comprising a thermoplastic polymer and at least two plasticizers (at least one first plasticizer and at least one second plasticizer) as described herein. The level of pigments in the compositions to be used according to the present invention is typically not more than 10 phr, preferably in the range from 0.01 to 5 phr and more preferably in the range from 0.1 to 3 phr. Examples of useful inorganic pigments are $TiO_2$, $CdS$, $CoO/Al_2O_3$, $Cr_2O_3$. Examples of useful organic pigments are, for example, azo dyes, phthalocyanine pigments, dioxazine pigments and also aniline pigments.

The polymer composition comprising a thermoplastic polymer and at least two plasticizers (at least one first plasticizer and at least one second plasticizer) as described herein may contain one or more filler, including mineral and/or synthetic and/or natural, organic and/or inorganic materials, for example, calcium oxide, magnesium oxide, calcium carbonate, barium sulphate, silicon dioxide, phyllosilicate, carbon black, bitumen, wood (e.g. pulverized, as pellets, micropellets, fibers, etc.), paper, natural and/or synthetic fibers, glass, etc.

The compositions described herein can be produced in various ways. In general, however, the composition is produced by intensively mixing all components in a suitable mixing container at elevated temperatures. The plastic pellet or powder (typically suspension PVC, microsuspension PVC or emulsion PVC) is typically mixed mechanically, i.e. for example in fluid mixers, turbomixers, trough mixers or belt screw mixers with the plasticizers and the other components at temperatures in the range from 60° C. to 140° C., preferably in the range from 80° C. to 110° C. The components may be added simultaneously or, preferably, in succession (see also E. J. Wickson "Handbook of PVC Formulating", John Wiley and Sons, 1993, pp. 747 ff). The blend of PVC, plasticizer and other additive as described above (e.g. the PVC compound or the PVC paste) is subsequently sent to the appropriate thermoplastic molding processes for producing the finished or semi-finished article, optionally a pelletizing step is interposed.

The blends (e.g. the PVC compound or the PVC paste) are particularly useful for production of garden hoses, pipes, and medical tubing, vinyl gloves, floor coverings, flooring tiles, films, sheeting, roofing, or roofing webs, pool liners, building protection foils, upholstery, and cable sheathing and wire insulation, particularly wire and cable coating, coated textiles and wall coverings.

The plasticizer combinations of the invention are useful across the range of plasticized polyvinyl chloride materials. The plasticizers of the invention are useful in the production of semi-rigid polyvinyl chloride compositions which typically contain from 10 to 40 phr, preferably 15 to 35 phr, more preferably 20 to 30 phr of plasticizers (phr=parts per hundred parts PVC); flexible polyvinyl chloride compositions which typically contain from 40 to 60 phr, preferably 44 to 56 phr, more preferably from 48 to 52 phr plasticizers; and highly flexible compositions which typically contain from 70 to 110 phr, preferably 80 to 100 phr, more preferably 90 to 100 phr of plasticizers.

One widespread use of polyvinyl chloride is as a plastisol. A plastisol is a fluid or a paste consisting of a mixture of polyvinyl chloride and a plasticizer optionally containing various additives, such as those described above. A plastisol is used to produce layers of polyvinyl chloride which are then fused to produce coherent articles of flexible polyvinyl chloride. Plastisols are useful in the production of flooring, tents, tarpaulins, coated fabrics such as automobile upholstery, in car underbody coatings, in moldings and other consumer products. Plastisols are also used in footwear, fabric coating, toys, flooring products and wallpaper. Plastisols typically contain 40 to 200 phr, more typically 50 to 150 phr, more typically 70 to 120 phr, more typically 90 to 110 phr of plasticizers.

In a preferred embodiment of the invention, the combination of two or more plasticizers (at least one first plasticizer and at least one second plasticizer) as described herein is combined with a polymer such as PVC to form a PVC compound (typically made from suspension PVC) or a PVC paste (typically made from an emulsion PVC). A particularly useful PVC in the PVC compound or paste is one having a K value of 65 or more, preferably from 65 to 95, preferably from 70 to 90, preferably from 70-85, alternately the PVC has a K value above 70 (K value is determined according to ISO 1628-2). Particularly preferred PVC compounds or paste comprise: 20 to 200 phr, (alternately 20 to 100 phr) plasticizers and/or 0.5 to 15 phr stabilizer(s), and/or 1 to 100 phr (alternately 1 to 30 phr), preferably 15 to 90 phr (alternately 15 to 30 phr) filler(s), even more preferably the filler is calcium carbonate and the stabilizer is a calcium/zinc stabilizer. The above combination is useful in wire and cable coatings, particularly automobile wire and cable coating and/or building wire insulation.

In general, a particularly good (i.e. low) glass transition temperature is achievable for the polymer compositions of the present invention by using plasticizers which itself have a low glass transition temperature and/or by using a high plasticizer content. Polymer compositions of the present invention may have glass transition temperatures in the range from −70° C. to +10° C., preferably in the range from −60° C. to −5° C., more preferably in the range from −50° C. to −20° C. and most preferably in the range from −45° C. to −30° C.

Glass transitions (Tg) of the different ester fractions are midpoints of the second heats obtained by Differential Scanning Calorimetry (DSC) using a TA Instruments Q100 calorimeter fitted with a cooling accessory. Typically, 6 to 10 mg of the sample are sealed in an aluminum pan and loaded into the instrument at room temperature. Melting data (first heat) is acquired by heating the sample to at least 30° C. above its melting temperature at a heating rate of 10° C./min. The sample is held for at least 5 minutes at this temperature to destroy its thermal history. Crystallization data are acquired by cooling the sample from the melt to at least 50° C. below the crystallization temperature, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures reported are the peak melting temperatures from the second heat unless otherwise specified. For purposes of this invention and the claims thereto, Tg is determined by DSC, unless otherwise indicated.

We claim:

1. A mixture comprising: 1) at least one first plasticizer compound(s) of the formula:

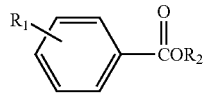

wherein $R_1$ is a saturated or unsaturated cyclic hydrocarbon optionally substituted with an alkyl and/or an OXO-ester, and $R_2$ is a $C_4$ to $C_{20}$ hydrocarbyl; and 2) one or more second plasticizers comprising alkyl terephthalate, alkyl phthalate, alkyl benzoate ester, di-benzoate ester, ester of cyclohexane polycarboxylic acid, dialkyl adipate, or a mixture thereof.

2. The mixture of paragraph 1, wherein $R_1$ is located at the ortho-, meta- or para-position.

3. The mixture of paragraph 1, wherein $R_1$ is phenyl located at the para-position.

4. The mixture of paragraph 3, wherein $R_1$ is a phenyl group where the phenyl is substituted with an alkyl and/or an OXO-ester at the ortho-, meta-, or para-position.

5. The mixture of paragraph 1, wherein $R_1$ is tolyl.

6. The mixture of paragraph 1, wherein $R_2$ is not linear.

7. The mixture of paragraph 1, wherein the first plasticizer compound is a mixture of at least two compounds represented by the formula in claim 1, where $R_2$ is branched in the first first plasticizer and $R_2$ is linear in the second first plasticizer compound.

8. The mixture of paragraph 1, wherein the first plasticizer compound(s) are represented by one or more of the formulae:

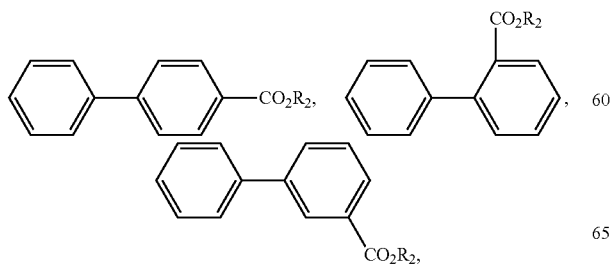

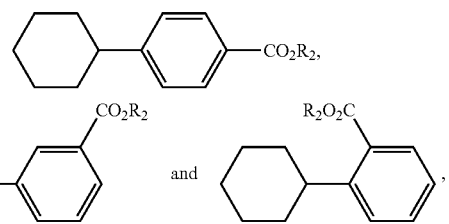

wherein $R_2$ is a $C_4$ to $C_{20}$ hydrocarbyl.

9. The mixture of paragraph 1, wherein the first plasticizer compound(s) are represented by one or more of the formulae:

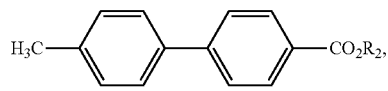

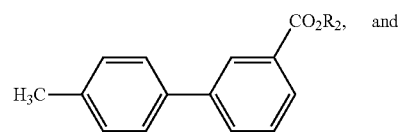

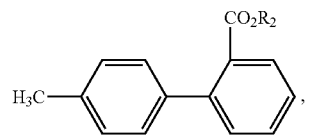

wherein $R_2$ is a $C_4$ to $C_{20}$ hydrocarbyl.

10. The mixture of paragraph 1, wherein the first plasticizer compound(s) are represented by one or more of the formulae:

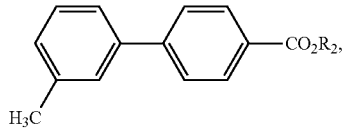

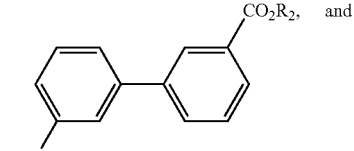

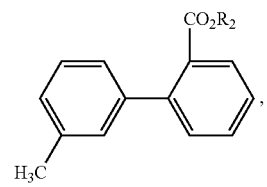

wherein $R_2$ is a $C_4$ to $C_{20}$ hydrocarbyl.

11. The mixture of paragraph 1, wherein the first plasticizer compound(s) are represented by one or more of the formulae:

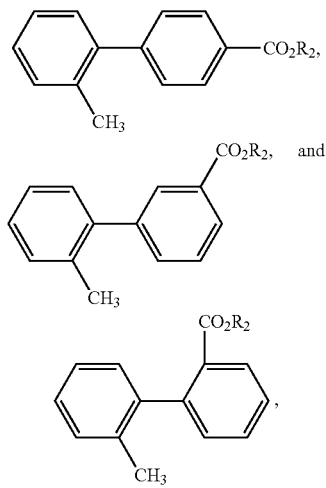

wherein $R_2$ is a $C_4$ to $C_{20}$ hydrocarbyl.

12. The mixture of paragraph 1, wherein $R^1$ is tolyl and $R^2$ is a $C_9$ or $C_{10}$ hydrocarbyl.

13. The mixture of paragraph 1, wherein $R^1$ is a saturated or unsaturated cyclic hydrocarbon substituted with an OXO-ester.

14. The mixture of paragraph 1, wherein the first plasticizer compound(s) comprises at least two compounds of the formula:

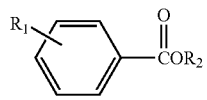

wherein each $R_1$ is, independently, a saturated or unsaturated cyclic hydrocarbon optionally substituted with an alkyl and/or an OXO-ester, and each $R_2$ is, independently, a $C_4$ to $C_{20}$ hydrocarbyl.

15. The mixture of paragraph 14, wherein in the first compound, $R_1$ is a saturated cyclic hydrocarbon optionally substituted with an alkyl and/or an OXO-ester, and in the second compound $R_1$ is an unsaturated cyclic hydrocarbon optionally substituted with an alkyl and/or an OXO-ester.

16. The mixture of paragraph 15 where each $R_1$ is a $C_6$ ring optionally substituted with an alkyl and/or an OXO-ester.

17. The mixture of paragraph 1, wherein the first plasticizer compound(s) comprises at least two compounds of the formula:

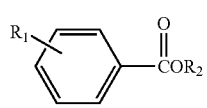

wherein in the first compound, $R_1$ is a saturated cyclic hydrocarbon optionally substituted with an alkyl and/or an OXO-ester, and $R_2$ is a $C_4$ to $C_{20}$ hydrocarbyl, preferably a hydrocarbon residue of a $C_4$ to $C_{20}$ OXO-alcohol; and in the second compound, $R_1$ is an unsaturated cyclic hydrocarbon optionally substituted with an alkyl and/or an OXO-ester, and $R_2$ is a $C_4$ to $C_{20}$ hydrocarbyl, preferably a hydrocarbon residue of a $C_4$ to $C_{20}$ OXO-alcohol.

18. The mixture of paragraph 17 where each $R_1$ is a $C_6$ ring optionally substituted with an alkyl and/or an OXO-ester.

19. The mixture of paragraph 1 wherein the first plasticizer compound(s) comprises at least two compounds of the formula:

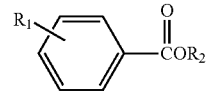

wherein each $R_1$ is, independently, a saturated or unsaturated cyclic hydrocarbon optionally substituted with an alkyl and/or an OXO-ester, and each $R_2$ is, independently, a $C_4$ to $C_{20}$ hydrocarbyl, preferably a hydrocarbon residue of a $C_4$ to $C_{20}$ OXO-alcohol.

20. The mixture of paragraph 1, wherein the second plasticizer compound(s) comprises at least two compounds from the group consisting of alkyl terephthalates, alkyl phthalates, alkyl benzoate esters, di-benzoate esters, esters of cyclohexane polycarboxylic acids, and dialkyl adipates.

21. The mixture of paragraph 1, wherein the second plasticizer compound(s) comprises $C_4$ to $C_{12}$ alkyl terephthalates, $C_4$ to $C_{40}$ alkyl phthalates, $C_4$ to $C_{40}$ alkyl isophthalates, $C_7$ to $C_{13}$ alkyl benzoate esters, $C_4$ to $C_{13}$ dialkyl adipates, or combinations thereof.

22. The mixture of paragraph 1, wherein the second plasticizer compound(s) comprises one or more of di-n-butyl terephthalate, diisobutyl terephthalate, di-n-octyl terephthalate, diisooctyl terephthalate, di-2-ethylhexyl terephthalate, di-n-nonyl terephthalate, diisononyl terephthalate, di-n-decyl terephthalate, di-2-propyl heptyl terephthalate, diisodecyl terephthalate, di-n-nonyl phthalate, diisononyl phthalate, di-n-decyl phthalate, diisodecyl phthalate, di-2-propyl heptyl phthalate, di-n-undecyl phthalate, ditridecyl phthalate, diisotridecyl phthalate, di-n-propyl isophthalate, di-n-nonyl isophthalate, diisononyl isophthalate, di-n-decyl isophthalate, diisodecyl isophthalate, di-2-propyl heptyl isophthalate, di-n-undecyl isophthalate, diisotridecyl isophthalate, isononyl benzoate, nonyl benzoate, isodecyl benzoate, decyl benzoate, 2-propylheptyl benzoate, isoundecyl benzoate, isotridecyl benzoate, di-heptyl cylohexanoate, di-2-ethylhexyl cylochexanoate, di-n-nonyl cylochexanoate, diisononyl cylochexanoate, di-n-decyl cylochexanoate, diisodecyl cylochexanoate, di-2-propyl heptyl cylochexanoate, diheptyl adipate, dioctyl adipate, diisononyl adipate, diisodecyl adipate, di 2-propylheptyl adipate, dipropylene glycol dibenzoate, diethylene glycol dibenzoate, triethylene glycol dibenzoate, or mixtures thereof.

23. The mixture of paragraph 1, wherein the second plasticizer compound(s) comprises one or more alkyl 1,2-cyclohexanedicarboxylates, alkyl 1,3-cyclohexanedicarboxylates and/or alkyl 1,4-cyclohexanedicarboxylates, where the alkyl has 4 to 13 carbons in the side chain.

24. The mixture of paragraph 1, wherein the second plasticizer compound(s) comprises one or more of di-(2-ethylhexyl) phthalate, diisononyl phthalate, diisonyl phthalate, diisodecyl phthalate, di-(2-propylheptyl) phthalate, heptylundecyl phthalate, nonylundecyl phthalate, diundecyl phthalate, diisoundecyl phthalate, diisotridecyl phthalate, diisonyl cyclohexanoate, bis(2-ethyl hexyl)cyclohexanoate, diisononyl cyclohexanoate, di-(2-ethylhexyl) adipate, diisononyl adipate, isononyl benzoate, isodecyl benzoate, and bis(2-ethylhexyl) terephthalate.

25. The mixture of paragraph 1, wherein the second plasticizer compound(s) comprises one or more of di-isononyl phthalate, di-isononyl adipate, isodecyl monobenzoate, and the first plasticizer comprises one or more substituted or unsubstituted biphenyl carboxylates.

26. The mixture of paragraph 1, wherein the first plasticizer(s) is present at 1 to 99 wt % and the second plasticizer(s) is present at 99 to 1 wt %, based upon the weight of the plasticizers.

27. A polymer composition comprising a thermoplastic polymer and 20 to 120 phr of the mixture of paragraph 1.

28. A polymer composition comprising a thermoplastic polymer, at least one first plasticizer of the formula:

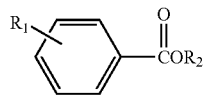

wherein $R_1$ is a saturated and unsaturated cyclic hydrocarbon optionally substituted with an alkyl and/or an OXO-ester, and $R_2$ is a $C_4$ to $C_{20}$ hydrocarbyl; and a second plasticizer comprising alkyl terephthalate, alkyl phthalate, alkyl benzoate ester, di-benzoate ester, ester of cyclohexane polycarboxylic acid, dialkyl adipate, or a mixture thereof.

29. The polymer composition of paragraph 28, wherein the thermoplastic polymer is selected from the group consisting of vinyl chloride resins, polyesters, polyurethanes, ethylene-vinyl acetate copolymer, rubbers, poly(meth)acrylics and combinations thereof.

30. The polymer composition of paragraph 28, wherein the thermoplastic polymer is polyvinyl chloride.

31. The polymer composition of paragraph 28, wherein the thermoplastic polymer is present at 99 to 40 wt % and the plasticizers are present at 1 to 60 wt %.

32. A wire and cable coating formulation comprising: i) 100 parts by weight PVC; ii) 20 to 80 parts of the mixture of paragraph 1; iii) a filler; and iv) a stabilizer.

33. The wire and cable coating formulation of paragraph 32, wherein the filler is present at from 1 to 100 parts by weight per 100 parts of the PVC and the stabilizer is present at from 5 to 15 parts by weight per 100 parts of the PVC.

34. A wire or cable coated with a composition of paragraph 32.

35. A cable filling compound comprising: i) 100 parts by weight PVC; ii) 20 to 80 parts by weight per 100 parts of the PVC of the mixture of claim 1; iii) 1 to 600 parts by weight per 100 parts of the PVC of filler; and iv) 5 to 15 parts by weight per 100 parts of the PVC of stabilizer.

36. The mixture of paragraph 28, wherein the composition comprises the plasticizer in an amount of from 5 to 90 phr.

37. The polymer composition of paragraph 28, wherein the composition further comprises an additive selected from the group consisting of trialkyl trimellite, alkylsulphonic ester, glycerol ester, isosorbide ester, citric ester, alkylpyrrolidone, and epoxidized oil.

38. The polymer composition of paragraph 28, wherein the thermoplastic polymer is a PVC suspension, a PVC micro-suspension, a PVC emulsion, or a combination thereof.

39. The polymer composition of paragraph 28, further comprising: an additive selected from the group consisting of a filler, a pigment, a matting agent, a heat stabilizer, an antioxidant, a UV stabilizer, a flame retardant, a viscosity regulator, a solvent, a deaerating agent, an adhesion promoter, a process aid, and a lubricant.

40. A floor covering comprising the composition of paragraph 28.

41. A wallpaper comprising the composition of paragraph 28.

42. A tarpaulin comprising the composition of paragraph 28.

43. A coated textile comprising the composition of paragraph 28.

44. A wall covering comprising the composition of paragraph 28.

45. A film comprising the polymer composition of paragraph 28 wherein the film is a roofing sheet, a tarpaulin, an advertising banner, synthetic leather, packaging film, a medical article, a toy, a seal, or an automobile interior article.

46. The mixture of paragraph 1, wherein the second plasticizer compound(s) comprises one or more of di-isononyl phthalate, di-isononyl adipate, isodecyl monobenzoate, and the first plasticizer comprises one or more compounds represented by the formula:

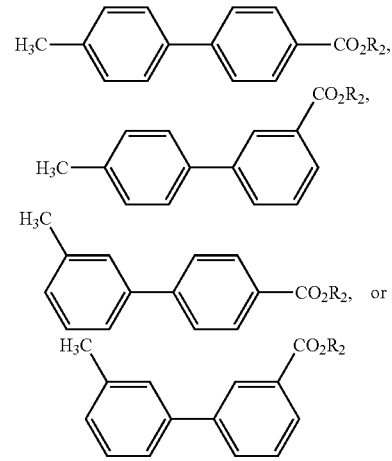

wherein $R_2$ preferably is $C_7H_{15}$, $C_9H_{19}$, $C_{10}H_{21}$, $C_{11}H_{23}$ or $C_{13}H_{27}$.

EXPERIMENTAL

The following examples are meant to illustrate the present disclosure and inventive processes and provide where appropriate, a comparison with other methods, including the products produced thereby. Numerous modifications and variations are possible and it is to be understood that within the scope of the appended claims, the disclosure can be practiced otherwise than as specifically described herein.

Test Methods.

Viscosity for the Plastisol—is determined according to ASTM D 1824-Standard test method is used for apparent viscosity of plastisols and organosols at low shear rates using a Brookfield viscometer, spindle RV 1 to 7.

Viscosity and Density for the Neat Plasticizer—is determined by ASTM D 7042-Standard Test Method is used for Dynamic Viscosity and Density of Liquids by Stabinger Viscometer (and the Calculation of Kinematic Viscosity).

Low Temperature Flexibility—is determined by Clash & Berg measurement according to ASTM D 1043-84-Stiffness properties of plastics as a function of temperature by means of a torsion test.

Neat Plasticizer Volatility—Neat plasticizer weight loss (in wt %) is measured on neat plasticizer after heating plasticizer for 24 h at 115° C. in a forced ventilated oven (>160 air renewal/hour).

Solution Temperature is the temperature at which a blend of thermoplastic polymer (such as PVC) and plasticizer forms a single phase with fluid properties.

Unless otherwise indicated, Tg is determined using Differential Scanning Calorimetry (DSC). Typically, 6 to 10 mg of molded sample are sealed in an aluminum pan and loaded into the instrument at room temperature. Melting data (first heat) is acquired by heating the sample to at least 30° C. above its melting temperature at a heating rate of 10° C./min. The sample is held for at least 5 minutes at this temperature to destroy its thermal history. Crystallization data are acquired by cooling the sample from the melt to at least 50° C. below the crystallization temperature, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures.

Materials

The various additives or components mentioned in the formulations are as follows: Solvin™ 382 NG is an emulsion PVC available from Solvin, S. A., Brussels Belgium.

Solvin™ 266 SF is a blending resin available from Solvin, S. A., Brussels Belgium.

Solvin™ 271 pc is suspension PVC resin for cable sheathing and insulation, available from Solvin, S. A., Brussels Belgium.

Vinnolit P 4472 is a fine-particle emulsion homopolymer available from Vinnolit GmbH & Co. KG, Germany.

Baeropan M C or R-KA 83/5-standard Calcium/Zinc one-packs for cable sheathing available from Baerlocher GmbH, Germany.

Barostab™ CT 9183 XRF—CaZn stabilizer from Baerlocher GmbH, Germany (Standard, low phenol, 2-EHA free, nonylphenol free, BBA free, low odor).

Jayflex™ DINP is the di-isononyl phthalate available from ExxonMobil Chemical Company, Houston, Tex.

Jayflex™ DINA is the di-isononyl adipate available from ExxonMobil Chemical Company, Houston, Tex.

Jayflex™ MB10 is an isodecyl monobenzoate available from ExxonMobil Chemical Company, Houston, Tex.

Exxsol™ D100 is an Hydrocarbon Fluid used as a solvent in industrial applications, available from ExxonMobil Chemical Company, Houston, Tex.

Microdol™ A200 is a calcium/magnesium carbonate available from Omya, UK Ltd, England.

Omya™ EXH1 $CACO_3$ is ultra fine calcium carbonate available from Omya, UK Ltd, England.

TABLE 1

Properties of neat plasticizer where $R_1$ is a benzene ring or toluene ring.

| | Plasticizers | | | | | |
|---|---|---|---|---|---|---|
| | 4-biphenyl isodecyl carboxylate | 4-biphenyl isoundecyl carboxylate | 4-biphenyl isotridecyl carboxylate | 3'methyl-biphenyl-3 isodecyl carboxylate | 3'methyl-biphenyl-4 isodecyl carboxylate | 4'methyl-biphenyl-4 isodecyl carboxylate |
| Dynamic Viscosity (mPas) | 127.9 | 158.7 | 262.1 | 267 | 221 | 174 |
| Density (g/cc) | 1.0068 | 1.0009 | 0.9896 | 1.001 | 1.000 | 1.000 |
| Solution temp. (° C.) | 120 | 124 | 135 | 128 | 123 | 122 |
| Volatility by TGA (wt % @ 220° C.) | | | | | 3.7 | 3.9 |
| Tg (° C.) DSC | | | | −63 | −66 | +7° C. |

The esters in Table 1 were obtained from the esterification of 4-biphenyl carboxylic acid with respectively isodecyl (Exxal™ 10 alcohol), isoundecyl (Exxal™ 11 alcohol) and isotridecyl alcohols (Exxal™ 13 alcohol) or by the esterification of 3' methyl biphenyl-3 carboxylic acid with isodecyl (Exxal™ 10 alcohol). The compounds described in Table 1 can be produced according to the methods described in U.S. Ser. No. 13/751,835, filed Jan. 28, 2013; U.S. Ser. No. 14/164,889, filed Jan. 27, 2014; U.S. Ser. No. 14/201,173, filed Mar. 7, 2014; U.S. Ser. No. 14/201,226, filed Mar. 7, 2014; U.S. Ser. No. 14/201,287, filed Mar. 7, 2014; U.S. Ser. No. 14/201,224, filed Mar. 7, 2014; U.S. Ser. No. 14/201,284, filed Mar. 7, 2014.

Example 2

Prophetic

We contemplate that first plasticizer can be advantageously mixed with the second plasticizers listed in the columns 1 to 11 of Table 3. The resulting blend will have improved neat and key properties (as listed in Table 4) and will be advantageous for the use and processing of flexible PVC articles. Hence, contemplated useful plasticizers, blends made of first and second plasticizers and their properties are described in Tables 3, 4 and 5. Note that 12 and 13 can be used as first plasticizer alone or in combination with the methyl biphenyl carboxylate and a second plasticizer.

TABLE 3

Summary of neat properties for first plasticizer and second plasticizer

| | First Plasticizer | Selection of second plasticizers that can advantageously mixed with first plasticizer | | | | | | |
|---|---|---|---|---|---|---|---|---|
| | | 1 | 2 | 3 | 4 | 5 | 6 | 7 |
| Properties | Methyl biphenyl carboxylate | Mono-Benzoate | 1-2 Cyclohexanoate | | 1-4 Cyclohexanoate | | Adipate | TOTM/TINTM |
| Carbon Number | C9-C10 | C9-C13 | C7-C8 | C9-C10 | C4-C8 | C9-C10 | C7-C10 | C8-C9 |
| Example of commercial grade | | MB10 | DPEH | DINCH | | | DINA | TOTM |
| Neat Viscosity (mPa · s) | 170-267 | 10-25 | 30-40 | 45-90 | 13-30 | 55-80 | 15-30 | 305-330 |
| Plasticizer Solution T° | 122-128 | 125 | 120-135 | 141-167 | 92-138 | 146-154 | 144-154 | 135-140 |
| Density (g/cc) | 1.000 | 0.953-0.943 | 0.97-0.95 | 0.95-0.93 | 0.99-0.96 | 0.94 | 0.924-0.916 | 0.988-0.976 |
| Neat plasticizer volatility wt % (24 h at 155° C.) | 7 | 99 | 20-15 | 8-5 | — | — | 26-6 | 1-5 |
| C&B T° C. @ 50 Phr | −9 to +1 | −24 | −21 | −29 | — | — | −50 | −20/−15 |

| | First Plasticizer | Selection of second plasticizers that can advantageously mixed with first plasticizer | | | | | |
|---|---|---|---|---|---|---|---|
| | | 8 | 9 | 10 | 11 | 12 | 13 |
| Properties | Methyl biphenyl carboxylate | Tere-phthalate | Tere-Phthalate | Ortho-Phthalate | Di-Benzoate | Partially hydrogenated first plasticizer | First plasticizer with R₂_short chain alcohols |
| Carbon Number | C9-C10 | C4-C7 | C8-C10 | C9-C13 | Mix of | C13 glycols | C6-C7 |
| Example of commercial grade | | | DOTP | DINP | Benzoflex | | |
| Neat Viscosity (mPa · s) | 170-267 | 21-65 | 80-140 | 75-355 | 80-90 | (<100) | (140) |
| Plasticizer Solution T° | 122-128 | 97-125 | 135-155 | 125-145 | 110 | (>128) | (110) |
| Density (g/cc) | 1.000 | 1.05-0.99 | 0.984-0.96 | 0.972-0.955 | 1.16 | (<1.00) | 1.00 |
| Neat plasticizer volatility wt % (24 h at 155° C.) | 7 | — | 8 | 7-2 | 10 | — | — |
| C&B T° C. @ 50 Phr | −9 to +1 | −16 | −30/−18 | −25/−20 | — | (<−9) estimated | (0) |

TABLE 4

Summary of advantages anticipated from a mixture of first plasticizer and second plasticizers listed in columns 1 to 11 of Table 4. The resulting blend of first plasticizer with one or more of the plasticizers from column 1 to 11 will improve properties as listed.

|  | 1 | 2 | 3 | 4 | 5 | 6 | 7 | 8 |
|---|---|---|---|---|---|---|---|---|
| Properties of the mixture of first plasticizer with listed plasticizer per column (such as methyl biphenyl carboxylate) | Mono-Benzoate | 1-2 Cyclohexanoate | | 1-4 Cyclohexanoate | | Adipate | TOTM/ TINTM | Tere-phthalate |
| Carbon Number | C9-C13 | C7-C8 | C9-C10 | C4-C8 | C9-C10 | C7-C10 | C8-C9 | C4-C7 |
| Example of commercial grade | MB10 | DPEH | DINCH | Internal Synthesis | Internal Synthesis | DINA | TOTM | Internal Synthesis |
| Neat plasticizer mix viscosity | Lower | Lower | Lower | Lower | Lower | Lower | Higher | Lower |
| Initial plastisol Viscosity | Lower | Lower | Lower | Lower | Lower | Lower | Higher | Lower |
| Plastisol Gelation Temperature. | Lower | Similar | Higher | Similar | Higher | Higher | Higher | Similar |
| Neat plasticizer blend.volatility | Higher | Higher | Higher | Higher | Higher | Higher | Lower | Higher |
| Cold Flex Temp. | Better lower | Better lower | Better lower | Better lower | Better similar | Better lower | Similar higher | Better lower |
| Plasticizer mix efficiency | | | | | | | | |
| Dry blending Time | Shorter | Shorter | Shorter | Shorter | Shorter | Longer | Longer | Shorter |

|  | 9 | 10 | 11 | 12 | 13 |
|---|---|---|---|---|---|
| Properties of the mixture of first plasticizer with listed plasticizer per column (such as methyl biphenyl carboxylate) | Tere-Phthalate | Ortho-Phthalate | Di-Benzoate | Partially hydrogenated first plasticizer | First plasticizer with R$_2$_short chain alcohols |
| Carbon Number | C8-C10 | C9-C13 | Mix of glycols | C13 | C6-C7 |
| Example of commercial grade | DOTP | DINP | Benzoflex | Internal Synthesis | Internal Synthesis |
| Neat plasticizer mix viscosity | Lower | Lower | Lower | Lower | Lower |
| Initial plastisol Viscosity | Lower | Lower | Higher | Lower | Lower |
| Plastisol Gelation Temperature. | Higher | Higher | Lower | Higher | Higher |
| Neat plasticizer blend.volatility | Similar | Lower | Higher | Higher | Higher |
| Cold Flex Temp. | Better lower | Better lower | Similar lower | Better higher | Similar Higher |
| Plasticizer mix efficiency | | | | | |
| Dry blending Time | Longer | Shorter | Shorter | Longer | Shorter |

Resulting blend properties are either lower or similar or higher or better or shorter versus the properties of the same blend having only the first plasticizer.

TABLE 5

Preferred plasticizer blend ratio's when mixing first plasticizer with second plasticizers from column 1 to 11.

|  | 1 | 2 | 3 | 4 | 5 | 6 | 7 | 8 |
|---|---|---|---|---|---|---|---|---|
| Preferred ratio (with the balance being made up of polymer, such as PVC) | Mono-Benzoate | 1-2 Cyclohexanoate | | 1-4 Cyclohexanoate | | Adipate | TOTM/ TINTM | Tere-phthalate |
|  | C9-C13 | C7-C8 | C9-C10 | C4-C8 | C9-C10 | C7-C10 | C8-C9 | C4-C7 |

TABLE 5-continued

Preferred plasticizer blend ratio's when mixing first plasticizer with second plasticizers from column 1 to 11.

| Example of commercial grade | MB10 | DPEH | DINCH | Internal Synthesis | Internal Synthesis | DINA | TOTM | Internal Synthesis |
|---|---|---|---|---|---|---|---|---|
| Second Plasticizer (wt %) | 1-90 | 1-90 | 1-90 | 1-90 | 1-90 | 1-90 | 1-90 | 1-90 |
| First plasticizer (wt %), such as Methyl biphenyl carboxylate | 1-50 | 1-50 | 1-40 | 1-60 | 1-50 | 1-30 | 1-20 | 1-30 |

|  | 9 | 10 | 11 | 12 | 13 |
|---|---|---|---|---|---|
| Preferred ratio (with the balance being made up of polymer, such as PVC) | Tere-Phthalate | Ortho-Phthalate | Di-Benzoate | Partially hydrogenated first plasticizer | First plasticizer with $R_2$_short chain alcohols |
|  | C8-C10 | C9-C13 | Mix of glycols | C13 | C6-C7 |
| Example of commercial grade | DOTP | DINP | Benzoflex | Internal Synthesis | Internal Synthesis |
| Second Plasticizer (wt %) | 1-90 | 1-90 | 1-90 | 1-90 | 1-90 |
| First plasticizer (wt %), such as Methyl biphenyl carboxylate | 1-40 | 1-50 | 1-30 | 1-30 | 1-50 |

Example 5

Example of PVC Plastisol Formulations for a Flooring Wear Layer

| Formulations | 5.1 phr | 5.2 phr | 5.3 phr |
|---|---|---|---|
| PVC Solvin ™ 382NG PVC | 80 | 80 | 80 |
| PVC Solvin ™ 266 SF PVC | 20 | 20 | 20 |
| Jayflex ™ DINP | 40 |  |  |
| 3'methyl biphenyl 4 isodecyl carboxylate |  | 30 |  |
| Blend of 3'methyl biphenyl 4 isodecyl carboxylate with 4'methyl biphenyl 4 isodecyl carboxylate in ratio 50%/50% |  |  | 30 |
| Jayflex ™ MB10 (isodecyl mono benzoate) |  | 10 | 10 |
| Stabilizer (Barostab ™ CT9183XRF) | 2 | 2 | 2 |
| Plastisol viscosity after 2 hours (mPa · s) | 7000 | 5400 | 4900 |
| Plastisol viscosity after 1 day (mPa · s) | 6700 | 5150 | 5000 |
| Plastisol gelation temperature (° C.) G'@ $10^4$ Pa | 95 | 90 | 90 |
| Plastisol gelation temp. (° C.) G'@ $10^5$ Pa | 106 | 94 | 94 |

PVC plastisols were prepared by mixing in a Hobart mixer. The plastisols were prepared with 100 parts PVC (Solvin 382 NG), 40 parts of ester as shown above, and 2 parts of a conventional CaZn stabilizer.

The gelation temperatures of the plastisols, were determined by an Anton Paar Physica Rheometer MCR 301. The instrument was used in oscillation mode, frequency 1 hz, amplitude 0.01% and the heating rate is 10° C./min. The gelation temperature is reported when G' (Elastic modulus) reaches $10^4$ Pa and $10^5$ Pa.

Dynamic mechanical analysis of the plastisols, as they were heated to final fusion, gave an initial gelation temperature of respectively 95° C. and 106° C. (G' (Elastic modulus) is equal to respectively $10^4$ Pa and $10^5$ Pa) for DINP while the mixture of 3' methyl biphenyl 4 isodecyl carboxylate and isodecyl benzoate gave a lower initial gelation temperature of respectively 90° C. and 94° C., while the mixture of 3' methyl biphenyl 4 isodecyl carboxylate with 4' methyl biphenyl 4 isodecyl carboxylate in ratio 50%/50% and isodecyl benzoate resulted in a lower initial gelation temperature of respectively 90° C. and 94° C. Formulations 5.2 and 5.3 containing blends of the present invention were faster fusing than DINP as shown on the graph in FIG. 1 illustrating the gelation curves obtained by DMA (dynamic mechanical analysis) for flooring wear layer formulations.

The plastisol viscosity was determined by rotational Brookfield viscometer, equipped with standard disc spindles (RV series). Formulations 5.2 and 5.3 containing blends of the present invention exhibit lower initial plastisol viscosities as compared to 5.1 as shown in the table above.

Stain Resistance:

The above plastisols formulations from Example 5 were coated (film thickness 0.5 mm) and cured in a Werner Mattis Oven for 90 sec at 180° C.—airflow 2300 rpm. Staining substances (indicated below) were applied to the surface of the PVC film for 24 h. After this period, the remaining product is removed using ethanol and the degree of staining is visually evaluated. FIG. 2 highlights the improved stain resistance results for the formulations containing the plasticizer mixture of the present invention when compared to DINP.

Example 6

Examples of PVC Plastisols for a Flooring Impregnation Layer

| Formulations | 6.1 phr | 6.2 phr | 6.3 phr |
|---|---|---|---|
| Vinnolit ™ P4472 PVC | 70 | 70 | 70 |
| Solvin ™ 266 SF PVC | 30 | 30 | 30 |
| Jayflex ™ DINP | 70 |  |  |

-continued

| Formulations | 6.1 phr | 6.2 phr | 6.3 phr |
|---|---|---|---|
| 3'methyl biphenyl 4 isodecyl carboxylate | | 55 | |
| Blend of 3'methyl biphenyl 4 isodecyl carboxylate with 4'methyl biphenyl 4 isodecyl carboxylate in ratio 50%/50% | | | 55 |
| Jayflex ™ MB10 | | 15 | 15 |
| Exxsol ™ D100 | 4 | 4 | 4 |
| Stabilizer (Barostab ™ CT9183XRF) | 2 | 2 | 2 |
| Mircodol ™ A 200 | 180 | 180 | 180 |
| Plastisol Gelation Temperature (G' at $10^4$ Pa, ° C.) | 118 | 109 | 109 |
| Plastisol Gelation Temperature (G' at $10^5$ Pa, ° C.) | 126 | 117 | 117 |

Figure 3:
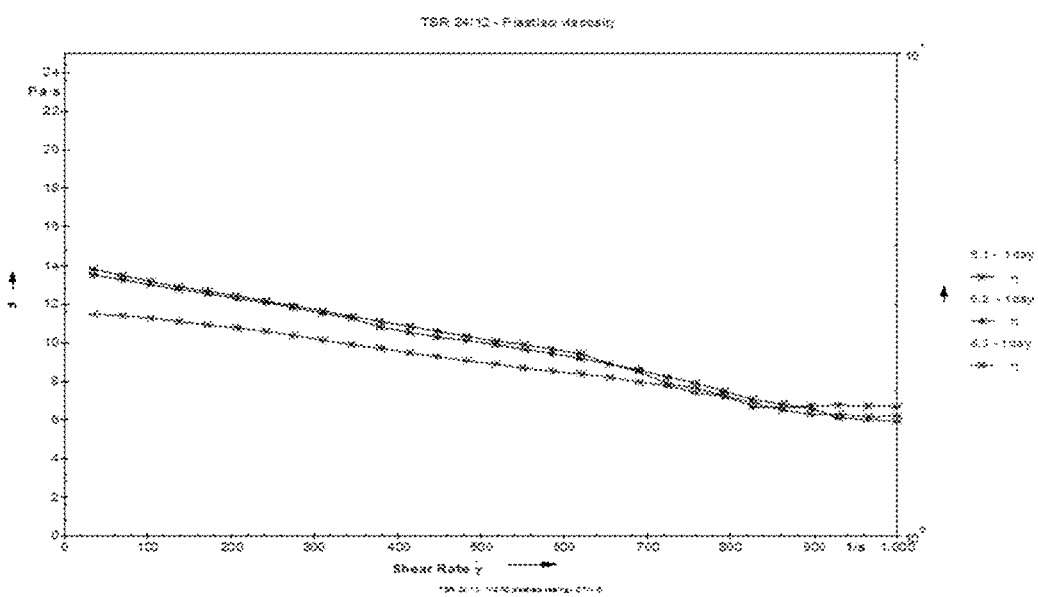
FIG. 3 shows plastisol viscosity, obtained by DMA, as a function of the shear rate after 1 day.

Dynamic mechanical analysis of the plastisols, as they were heated to final fusion, gave an initial gelation temperature of respectively 118° C. and 126° C. (G' (Elastic modulus) is equal to respectively $10^4$ Pa and $10^5$ Pa) for DINP while the mixture of 3' methyl biphenyl 4 isodecyl carboxylate and isodecyl benzoate gave a lower initial gelation temperature of respectively 109° C. and 117° C., while the mixture of 3' methyl biphenyl 4 isodecyl carboxylate with 4' methyl biphenyl 4 isodecyl carboxylate in ratio 50%/50% and isodecyl benzoate resulted in a lower initial gelation temperature of respectively 109° C. and 117° C. Formulations 6.2 and 6.3 containing blends of the present invention were faster fusing than DINP as shown on the graph in FIG. 3 which illustrates plastisol viscosities in function of the shear rate after 1 day obtained by DMA. All plastisols exhibited similar viscosities over the measured shear rate range.

Example 8

Examples of Flexible PVC Compounds.
Mechanical Properties, Tensile Before and after Ageing, Clash & Berg, Volatility NV

| PRODUCT | 8.1 phr | 8.2 phr | 8.3 phr | 8.4 phr | 8.5 phr | 8.6 phr | 8.7 Phr | 8.8 Phr |
|---|---|---|---|---|---|---|---|---|
| Solvin ™ 271 PVC | 100 | 100 | 100 | 100 | 100 | 100 | 100 | 100 |
| Jayflex ™ DINP | 50 | | | 75 | | | | |
| 3'methyl biphenyl 4 isodecyl carboxylate | | 50 | | | 75 | | 35 | 55 |
| Blend of 3'methyl biphenyl 4 isodecyl carboxylate with 4'methyl biphenyl 4 isodecyl carboxylate in ratio 50%/50% | | | 50 | | | 75 | | |
| Jayflex ™ DINA | | | | | | | 15 | 20 |
| Omya ™ EXH1 CACO$_3$ | 60 | 60 | 60 | 60 | 60 | 60 | 60 | 60 |
| Baeropan ™ MC-KA 83/5 | 4 | 4 | 4 | 4 | 4 | 4 | 4 | 4 |

The above formulations were prepared in a low speed Hobart mixer. The wet blend was then processed into a flexible sheet through milling on a Dr. Collins roll mill, at 165° C. for 6 minutes. The milled sheet was removed from the roll mill, cooled to room temperature, and then portions of this product were pressed to test specimens of various thicknesses, at 170° C. for 15 minutes. After cooling, the test specimens were removed from the molds, and conditioned for 7 days at 22° C. and 50% relative humidity. The Shore A hardness (ASTM D 2240-86) and tensile properties, e.g., 100% modulus, Tensile at break and Elongation at break, (30 mil test specimens, Type C die) were measured and are reported in Table below.

The tensile/mechanical properties (original) were obtained from samples in a Zwick tensile tester (T1-FR005TN.A50) measuring the modulus at 100% extension, the ultimate tensile strength in psi and ultimate elongation in % according to ASTM D 638. The same mechanical properties were measured on dumbbells that had been aged at 100° C. for 10 days, with airflow of +−150 air changes/hr.

Mechanical Properties

| Example | Shore A hardness | 100% Modulus (N/mm$^2$) | Tensile at Break (N/mm$^2$) | Elongation at break (%) |
|---|---|---|---|---|
| Example 8.1 | 37 | 11.4 | 16.2 | 303.7 |
| Example 8.2 | 41 | 13.2 | 18.7 | 300.3 |
| Example 8.3 | 42 | 13.2 | 18.6 | 309.7 |
| Example 8.7 | 36 | 12.0 | 18.1 | 318.0 |
| Example 8.4 | 21 | 7.00 | 13.6 | 365.2 |
| Example 8.5 | 24 | 7.6 | 14.8 | 342.0 |
| Example 8.6 | 24 | 7.7 | 15.5 | 360.0 |
| Example 8.8 | 22 | 7.1 | 13.9 | 347.2 |

Similar elongation at break and higher tensile observed for the various formulations. The mix of a first plasticizer with DINA exhibit lower hardness levels (higher plasticizer efficiency from the mix).

Cold Temperature Flexibility:

The low temperature flexibility of the materials was measured using the Clash and Berg test (ASTM D1043-84). Results show a substantial improvement in cold temperature flexibility for the blends of the present invention with the alkyl adipates before and after ageing.

| Example | Cold temperature Original (° C.) | Cold temperature in ° C. after ageing with natural ventilation (° C.) |
|---|---|---|
| Example 8.1 | −11.6 | −11.6 |
| Example 8.2 | 1.1 | 2.1 |
| Example 8.3 | 3.0 | 1.2 |
| Example 8.7 | −8.3 | −10.0 |
| Example 8.4 | −34.1 | −34.2 |
| Example 8.5 | −17.4 | −16.6 |

-continued

| Example | Cold temperature Original (° C.) | Cold temperature in ° C. after ageing with natural ventilation (° C.) |
|---|---|---|
| Example 8.6 | −14.8 | −15.1 |
| Example 8.8 | −29.9 | −29.0 |

Plasticizer Volatility and Compound Weight Loss:

Compounds weight loss (in wt %) after ageing in oven with airflow of +−8 air changes/hr (Natural Ventilation (NV) and in oven with airflow of +−160 air changes/hr (Forced Ventilation (FV) are reported in the Table below.

| Example | NV aging strips (wt %) | FV aging strips (wt %) |
|---|---|---|
| Example 8.1 | 0.43 | 4.16 |
| Example 8.2 | 0.31 | 3.85 |
| Example 8.3 | 0.40 | 3.84 |
| Example 8.7 | 0.52 | — |
| Example 8.4 | 0.44 | 5.12 |
| Example 8.5 | 0.35 | 4.63 |
| Example 8.6 | 0.41 | 4.43 |
| Example 8.8 | 0.67 | — |

Example 9

Blends of PVC (100 phr) with 50 phr plasticizer blend (20 wt % of second plasticizer: A, C, D, E or F and 80 wt % first plasticizer B) were made as follows: In a 250 ml beaker was added 2.7 g of an additive package containing a 70/30 wt/wt of Paraplex G62 ESO/Mark™ 4716. To this was added 19.1 g of plasticizer and the mixture is stirred with a spatula until blended. After blending, 38.2 g of PVC was added and the mixture was mixed forming a paste. The mixture was added to the melt mixture. A Haake Rheomix 600 mixer manufactured by Haake PolyLab System was preheated to the desired mixing temperature (165° C. for most experiments). A coarsely mixed sample consisting of plasticizer, polyvinylchloride and stabilizers was added to the mixer while stirring at 35 rpm. After addition the mixer was stopped for one minute. The mixer was started again and the sample was mixed for five minutes. After mixing for five minutes, the mixer was stopped and disassembled. The mixed sample was removed hot.

|   | First Plasticizer |
|---|---|
| B | biphenyldecylcarboxylate |
|   | Second plasticizer |
| A | diisonoyl phthalate |
| C | tridecyl benzoate |
| D | diisodecyladipate (Jayflex™ DIDA) |
| E | bis(2-ethylhexyl) decanedioate (DOS-Edenol™ 888) |
| F | C9 succinate |

Bars were then made for testing. The melt was pressed flat and cut into small pieces to be used for preparation of test bars by compression molding (size of pieces was similar to the hole dimensions of the mold plate). The film pieces were stacked into the holes of a multi-hole steel mold plate, pre-heated to 170° C., having hole dimensions 20 mm×12.8 mm×1.8 mm (ASTM D1693-95 dimensions). The mold plate was pressed in a PHI company QL-433-6-M2 model hydraulic press equipped with separate heating and cooling platforms. The upper and lower press plates were covered in Teflon™-coated aluminum foil and the following multistage press procedure was used at 170° C. with no release between stages: (1) 3 minutes with 1-2 ton overpressure; (2) 1 minute at 10 tons; (3) 1 minute at 20 tons; (4) 1 minute at 30 tons; (5) 3 additional minutes at 30 tons; and (6) release and 3 minutes in the cooling stage of the press (7° C.) at 30 tons. A knockout tool was then used to remove the sample bars with minimal flexion. Typically near-colorless, flexible bars were obtained which, when stored at room temperature, showed no oiliness or exudation after pressing unless otherwise noted. The bars were allowed to age at room temperature for at least 1 week prior to evaluation of phase behavior with Differential Scanning Calorimetry (DSC) and thermo-physical properties with Dynamic Mechanical Thermal Analysis (DMTA).

Figure 4:
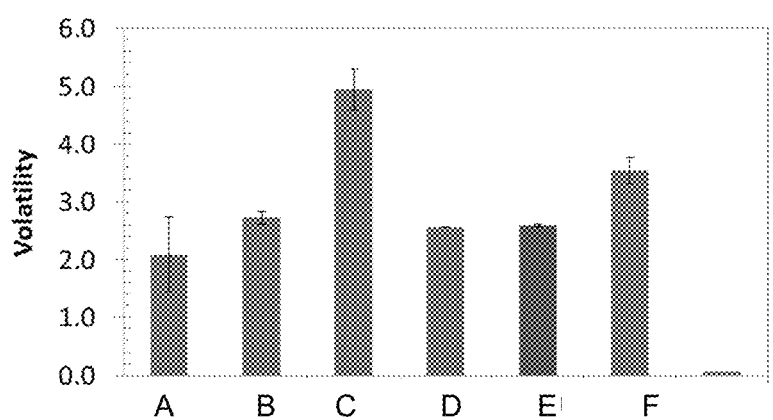
FIG. 4 is a graph of volatility for the samples of Example 9.
Figure 5:
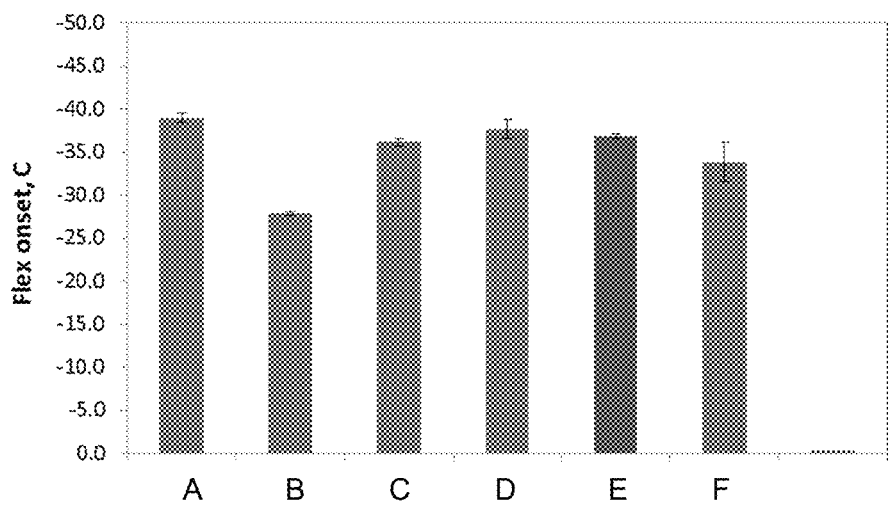
FIG. 5 is a graph of flex onset for the samples of Example 9.
Figure 6:
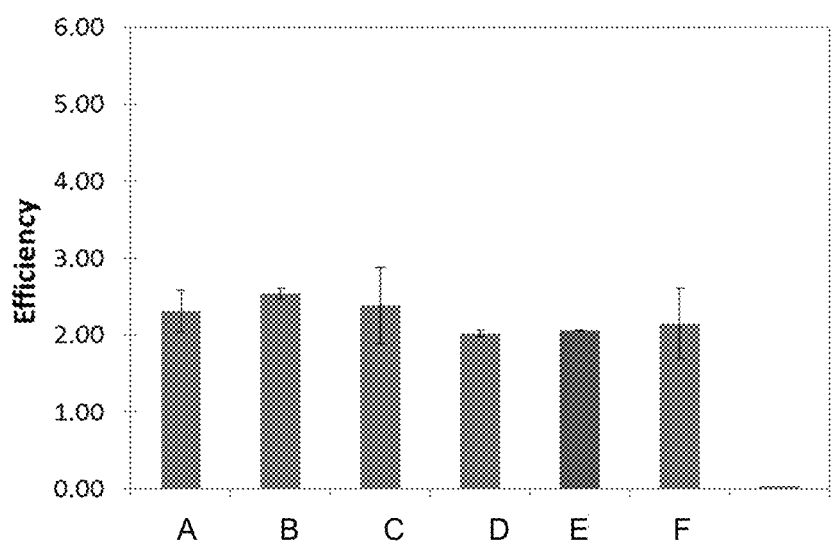
FIG. 6 is a graph of efficiency for the samples of Example 9.

Volatility (wt %), flex onset (° C.) and DMTA efficiency (normalized to 100% dioctyl phthalate) were measured according to the procedures below and are reported in FIGS. 4, 5 and 6. Column B in FIGS. 4, 5 and 6 reports data on 100% first plasticizer B (biphenyldecylcarboxylate).

Thermogravimetric Analysis (TGA):

Volatility was measured by thermogravimetric analysis and was conducted on the bars using a TA Instruments TGA5000 instrument (25-450° C., 10° C./min, under 25 cc $N_2$/min flow through furnace and 10 cc $N_2$/min flow through balance; sample size approximately 10 mg).

Dynamic Mechanical Thermal Analysis (DMTA):

A TA Instruments DMA Q800 fitted with a liquid $N_2$ cooling accessory and a three-point bend clamp assembly was used to measure the thermo-mechanical performance of neat PVC and the PVC/plasticizer blend sample bars prepared above. Samples were loaded at room temperature and cooled to −90° C. at a cooling rate of 3° C./min. After equilibration, a dynamic experiment was performed at one frequency using the following conditions: 3° C./min heating rate, 1 Hz frequency, 20 μm amplitude, 0.01N pre-load force, force track 120%. Two or three bars of each sample were typically analyzed and numerical data was averaged. The DMTA measurement gives storage modulus (elastic response modulus) and loss modulus (viscous response modulus); the ratio of loss to storage moduli at a given temperature is tan δ (tan delta). The tan δ peak is associated with the glass transition (temperature of the brittle-ductile transition). The beginning (flex onset) of the glass transition, Tg, was obtained from the tan δ curve for each sample by extrapolating a tangent from the steep inflection of the curve and the first deviation of linearity from the baseline prior to the beginning of the peak. Tg onset (taken from tan δ); peak of the tan δ curve; storage modulus at 25° C.; and the temperature at which the storage modulus equals 100 MPa (this temperature was chosen to provide an arbitrary measure of the temperature at which the PVC loses a set amount of rigidity) were determined. The storage modulus at 25° C. provides an indication of plasticizer efficiency (i.e., the amount of plasticizer required to achieve a specific stiffness); the higher the storage modulus, the more plasticizer required.

The meanings of terms used herein shall take their ordinary meaning in the art; reference shall be taken, in particular, to Handbook of Petroleum Refining Processes, Third Edition, Robert A. Meyers, Editor, McGraw-Hill (2004). In addition, all patents and patent applications (including priority documents), test procedures (such as ASTM methods), and other documents cited herein are fully incorporated by reference to the extent such disclosure is not inconsistent with this disclosure and for all jurisdictions in which such incorporation is permitted. Also, when numerical lower limits and numerical upper limits are listed herein, ranges from any lower limit to any upper limit are contemplated. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group consisting of," or "is" preceding the recitation of the composition, element, or elements and vice versa.

The disclosure has been described above with reference to numerous embodiments and specific examples. Many variations will suggest themselves to those skilled in this art in light of the above detailed description. All such obvious variations are within the full intended scope of the appended claims.

We claim:

1. A mixture comprising:
   1)
   (i) at least two first plasticizer compounds of the formula:

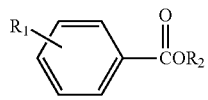

wherein each $R_1$ is, independently, a phenyl group where the phenyl is substituted with an alkyl and/or an OXO-ester at the ortho-, meta-, or para-position, and each $R_2$ is, independently, a $C_4$ to $C_{20}$ hydrocarbyl or ii) at least one first plasticizer compound(s) represented by one or more of the formulae:

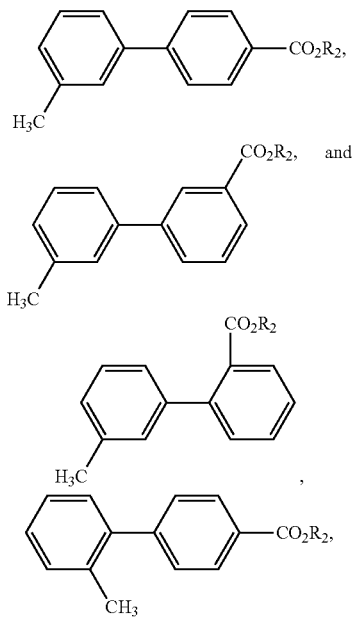

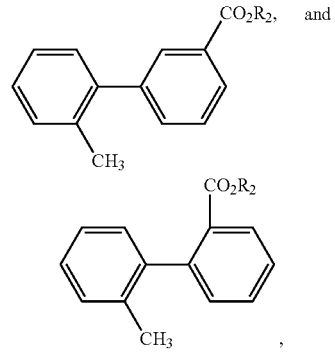

wherein $R_2$ is a $C_4$ to $C_{20}$ hydrocarbyl, 2) one or more second plasticizers comprising alkyl terephthalate, alkyl phthalate, alkyl benzoate ester, di-benzoate ester, ester of cyclohexane polycarboxylic acid, dialkyl adipate or a mixture thereof.

2. The mixture of claim 1, wherein at least one $R_1$ is located at the ortho-, meta- or para-position.

3. The mixture of claim 1, wherein at least one $R_1$ is phenyl located at the para-position.

4. The mixture of claim 1, wherein at least one $R_1$ is tolyl.

5. The mixture of claim 1, wherein at least one $R_2$ is not linear.

6. The mixture of claim 1, wherein the first plasticizer compound is a mixture of at least two compounds represented by the formula:

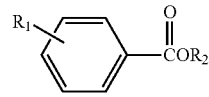

wherein $R_1$ is a phenyl group where the phenyl is substituted with an alkyl at the ortho-, meta-, or para-position, and $R_2$ is a $C_4$ to $C_{20}$ hydrocarbyl, where $R_2$ is branched in the first first plasticizer and $R_2$ is linear in the second first plasticizer compound.

7. The mixture of claim 1, wherein at least one $R^1$ is tolyl and at least one $R^2$ is a $C_9$ or $C_{10}$ hydrocarbyl.

8. The mixture of claim 1, wherein the second plasticizer compound(s) comprises at least two compounds from the group consisting of alkyl terephthalates, alkyl phthalates, alkyl benzoate esters, di-benzoate esters, esters of cyclohexane polycarboxylic acids, and dialkyl adipates.

9. The mixture of claim 1, wherein the second plasticizer compound(s) comprises $C_4$ to $C_{12}$ alkyl terephthalates, $C_4$ to $C_{14}$ alkyl phthalates, $C_4$ to $C_{14}$ alkyl isophthalates, $C_7$ to $C_{13}$ alkyl benzoate esters, $C_4$ to $C_{13}$ dialkyl adipates, or combinations thereof.

10. The mixture of claim 1, wherein the second plasticizer compound(s) comprises one or more of di-n-butyl terephthalate, diisobutyl terephthalate, di-n-octyl terephthalate, diisooctyl terephthalate, di-2-ethylhexyl terephthalate, di-n-nonyl terephthalate, diisononyl terephthalate, di-n-decyl terephthalate, di-2-propyl heptyl terephthalate, diisodecyl terephthalate, di-n-nonyl phthalate, diisononyl phthalate, di-n-decyl phthalate, diisodecyl phthalate, di-2-propyl heptyl phthalate, di-n-undecyl phthalate, ditridecyl phthalate, diisotridecyl phthalate, di-n-propyl isophthalate, di-n-nonyl isophthalate, diisononyl isophthalate, di-n-decyl isophthalate, diisodecyl isophthalate, di-2-propyl heptyl isophthalate, di-n-undecyl isophthalate, diisotridecyl isophthalate, isononyl benzoate, nonyl benzoate, isodecyl benzoate, decyl benzoate, 2-propylheptyl benzoate, isoundecyl benzoate, isotridecyl benzoate, di-heptyl cyclohexanoate, di-2-ethylhexyl cyclohexanoate, di-n-nonyl cyclohexanoate, diisononyl cyclohexanoate, di-n-decyl cyclohexanoate, diisodecyl cyclohexanoate, di-2-propyl heptyl cyclohexanoate, diheptyl adipate, dioctyl adipate, diisononyl adipate, diisodecyl adipate, di 2-propylheptyl adipate, dipropylene glycol dibenzoate, diethylene glycol dibenzoate, triethylene glycol dibenzoate, or mixtures thereof.

11. The mixture of claim 1, wherein the second plasticizer compound(s) comprises one or more alkyl 1,2-cyclohexanedicarboxylates, alkyl 1,3-cyclohexanedicarboxylates and/or alkyl 1,4-cyclohexanedicarboxylates, where the alkyl has 4 to 13 carbons in the side chain.

12. The mixture of claim 1, wherein the second plasticizer compound(s) comprises one or more of di-(2-ethylhexyl) phthalate, diisononyl phthalate, diisonyl phthalate, diisodecyl phthalate, di-(2-propylheptyl) phthalate, heptylundecyl phthalate, nonylundecyl phthalate, diundecyl phthalate, diisoundecyl phthalate, diisotridecyl phthalate, diisonyl cyclohexanoate, bis(2-ethyl hexyl) cyclohexanoate, diisononyl cyclohexanoate, di-(2-ethylhexyl) adipate, diisononyl adipate, isononyl benzoate, isodecyl benzoate, and bis(2-ethylhexyl) terephthalate.

13. The mixture of claim 1, wherein the second plasticizer compound(s) comprises one or more of diisononyl phthalate, diisononyl adipate, isodecyl monobenzoate, and the first plasticizer comprises one or more substituted or unsubstituted biphenyl carboxylates.

14. The mixture of claim 1, wherein the first plasticizer(s) is present at 1 to 99 wt % and the second plasticizer(s) is present at 99 to 1 wt %, based upon the weight of the plasticizers.

15. A polymer composition comprising a thermoplastic polymer and 20 to 120 phr of the mixture of claim 1.

16. A polymer composition comprising
1) a thermoplastic polymer;
2) (i) at least two first plasticizer compounds of the formula:

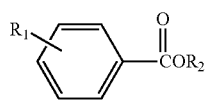

wherein each $R_1$ is, independently, a phenyl group where the phenyl is substituted with an alkyl and/or an OXO-ester at the ortho-, meta-, or para-position, and each $R_2$ is, independently, a $C_4$ to $C_{20}$ hydrocarbyl; or
ii) at least one first plasticizer compound(s) represented by one or more of the formulae:

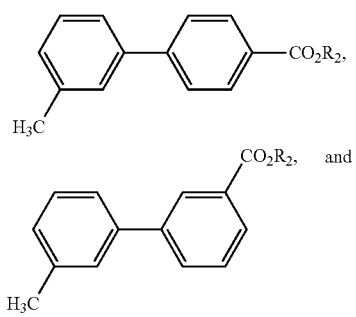

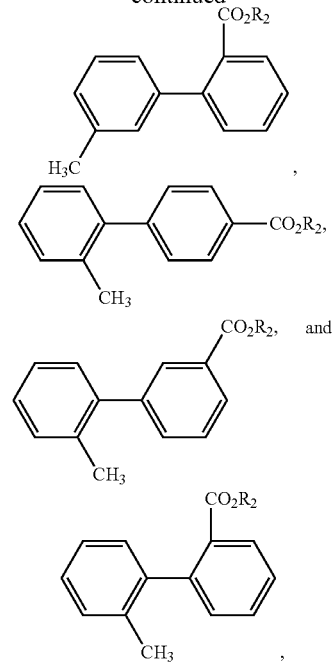

wherein $R_2$ is a $C_4$ to $C_{20}$ hydrocarbyl;
3) a second plasticizer comprising alkyl terephthalate, alkyl phthalate, $C_7$ to $C_{13}$ alkyl benzoate ester, dibenzoate ester, ester of cyclohexane polycarboxylic acid, dialkyl adipate or a mixture thereof.

17. The polymer composition of claim 16, wherein the thermoplastic polymer comprises vinyl chloride resins, polyesters, polyurethanes, ethylene-vinyl acetate copolymer, rubbers, poly(meth)acrylics and combinations thereof.

18. The polymer composition of claim 16, wherein the thermoplastic polymer is polyvinyl chloride.

19. The polymer composition of claim 16, wherein the thermoplastic polymer is present at 99 to 40 wt % and the plasticizers are present at 1 to 60 wt %.

20. A wire and cable coating formulation comprising: i) 100 parts by weight PVC; (ii) 20 to 80 parts of the compounds of the mixture of claim 1; (iii) a filler; and (iv) a stabilizer.

21. The wire and cable coating formulation of claim 20, wherein the filler is present at from 1 to 100 parts by weight per 100 parts of the PVC and the stabilizer is present at from 5 to 15 parts by weight per 100 parts of the PVC.

22. A wire or cable coated with a composition of claim 20.

23. A cable filling compound comprising: i) 100 parts by weight PVC; ii) 20 to 80 parts by weight per 100 parts of the PVC of the mixture of claim 1;
iii) 1 to 600 parts by weight per 100 parts of the PVC of filler; and iv) 5 to 15 parts by weight per 100 parts of the PVC of stabilizer.

24. The mixture of claim 16, wherein the composition comprises the plasticizers in an amount of from 5 to 90 phr.

25. The polymer composition of claim 16, wherein the composition further comprises an additive selected from the group consisting of trialkyl trimellite, alkylsulphonic ester, glycerol ester, isosorbide ester, citric ester, alkylpyrrolidone, and epoxidized oil.

26. The polymer composition of claim 16, wherein the thermoplastic polymer is a PVC suspension, a PVC microsuspension, a PVC emulsion, or a combination thereof.

27. The polymer composition of claim 16, further comprising: an additive selected from the group consisting of a filler, a pigment, a matting agent, a heat stabilizer, an antioxidant, a UV stabilizer, a flame retardant, a viscosity regulator, a solvent, a deaerating agent, an adhesion promoter, a process aid, and a lubricant.

28. A floor covering, wallpaper, tarpaulin, coated textile, or wall covering comprising the composition of claim 16.

29. A film comprising the polymer composition of claim 16, wherein the film is a roofing sheet, a tarpaulin, an advertising banner, synthetic leather, packaging film, a medical article, a toy, a seal, or an automobile interior article.

30. The mixture of claim 1, wherein the second plasticizer compound(s) comprises one or more of diisononyl phthalate, diisononyl adipate, isodecyl and monobenzoate.

31. A mixture comprising: 1) at least one first plasticizer compound(s) of the formula:

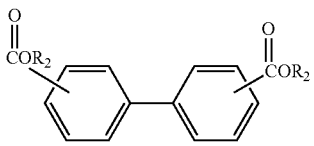

where $R_2$ is, independently, a $C_4$ to $C_{14}$ hydrocarbyl, and
2) one or more second plasticizers comprising alkyl terephthalate, alkyl phthalate, alkyl benzoate ester, dibenzoate ester, ester of cyclohexane polycarboxylic acid, or a mixture thereof.

32. A mixture comprising: 1) at least one first plasticizer compound(s) of the formula:

where $R_2$ is, independently, a $C_4$ to $C_{14}$ hydrocarbyl; and
2) one or more second plasticizers comprising dialkyl adipate.

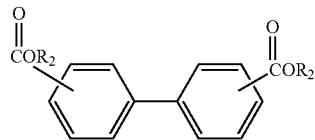

33. The mixture of claim 32 wherein the dialkyl adipate has 4 to 13 carbon atoms.

34. The mixture of claim 32 wherein the dialkyl adipate is diheptyl adipate, diisononyl adipate, diisodecyl adipate, or di-2-propylheptyl adipate.

35. The mixture of claim 32 wherein the dialkyl adipate is diisononyl adipate.

36. The mixture of claim 32 wherein each $R_2$ is, independently, a $C_6$, $C_7$, or $C_9$ hydrocarbyl.

37. The mixture of claim 32 wherein each $R_2$ is, independently, hexyl, heptyl, or nonyl, or an isomer thereof.

38. The mixture of claim 32 wherein each $R_2$ is, independently, hexyl, heptyl, or nonyl, or an isomer thereof, and the dialkyl adipate is diisononyl adipate.

* * * * *